United States Patent
Piao et al.

(10) Patent No.: US 9,307,263 B2
(45) Date of Patent: *Apr. 5, 2016

(54) METHOD AND APPARATUS FOR DETERMINING A CONTEXT MODEL FOR TRANSFORM COEFFICIENT LEVEL ENTROPY ENCODING AND DECODING

(71) Applicant: SAMSUNG ELECTRONICS CO., LTD., Suwon-si (KR)

(72) Inventors: Yin-ji Piao, Suwon-si (KR); Jung-hye Min, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/678,588

(22) Filed: Apr. 3, 2015

(65) Prior Publication Data

US 2015/0215644 A1 Jul. 30, 2015

Related U.S. Application Data

(63) Continuation of application No. 14/355,439, filed as application No. PCT/KR2012/009074 on Oct. 31, 2012.

(60) Provisional application No. 61/553,668, filed on Oct. 31, 2011, provisional application No. 61/671,955, filed on Jul. 16, 2012.

(51) Int. Cl.
*H04N 7/18* (2006.01)
*H04N 19/60* (2014.01)
(Continued)

(52) U.S. Cl.
CPC ......... *H04N 19/60* (2014.11); *H04N 19/00775* (2013.01); *H04N 19/176* (2014.11); *H04N 19/18* (2014.11); *H04N 19/186* (2014.11); *H04N 19/91* (2014.11)

(58) Field of Classification Search
CPC .............. H04N 19/00072; H04N 19/00084; H04N 19/00121; H04N 19/00533; H04N 19/00775; H04N 19/00957
USPC ......................................... 375/240.01–240.29
See application file for complete search history.

(56) References Cited

U.S. PATENT DOCUMENTS 8,599,925 B2    12/2013  Srinivasan
2006/0158355 A1  7/2006  Jeon et al.
(Continued)

FOREIGN PATENT DOCUMENTS

CN  102447908 A     5/2012
JP  2009-505494 A   2/2009
(Continued)

OTHER PUBLICATIONS

Bross, et al.; "WD4: Working Draft 4 of High-Efficiency Video Coding", International Organisation for Standardisation, Joint Collaborative Team on Video Coding (JCT-VC) of ITU-T SG16 WP3 and ISO/IEC JTC1/SC29/WG11, Jul. 2011, 230 pages total.

(Continued)

*Primary Examiner* — Andy Rao
(74) *Attorney, Agent, or Firm* — Sughrue Mion, PLLC

(57) ABSTRACT

Provided are a method and apparatus for determining a context model for entropy encoding and decoding of a transformation coefficient. According to the method and apparatus, a context set index ctxset is obtained based on color component information of a transformation unit, a location of a current subset, and whether there is a significant transformation coefficient having a value greater than a first critical value in a previous subset, and a context offset c1 is obtained based on a length of a previous transformation coefficient having consecutive 1s. Also, a context index ctxids for entropy encoding and decoding of a first critical value flag is determined based on the obtained context set index and the context offset.

2 Claims, 22 Drawing Sheets

(51) Int. Cl.
*H04N 19/91* (2014.01)
*H04N 19/176* (2014.01)
*H04N 19/186* (2014.01)
*H04N 19/18* (2014.01)

(56) References Cited

U.S. PATENT DOCUMENTS

| | | |
|---|---|---|
| 2007/0110153 A1 | 5/2007 | Cho et al. |
| 2008/0080620 A1 | 4/2008 | Lee et al. |
| 2008/0219578 A1 | 9/2008 | Lee et al. |
| 2008/0310504 A1 | 12/2008 | Ye et al. |
| 2009/0201986 A1 | 8/2009 | Schwarz et al. |
| 2012/0093425 A1 | 4/2012 | Lee et al. |
| 2013/0003824 A1* | 1/2013 | Guo .................... H04N 19/176 375/240.03 |
| 2013/0051459 A1 | 2/2013 | Kirchhoffer et al. |
| 2013/0148727 A1 | 6/2013 | Chen et al. |
| 2014/0003513 A1 | 1/2014 | Chen et al. |

FOREIGN PATENT DOCUMENTS

| | | |
|---|---|---|
| JP | 2009-165144 A | 7/2009 |
| KR | 10-2006-0083100 A | 7/2006 |
| KR | 10-2008-0008923 A | 1/2008 |
| KR | 10-2008-0082147 A | 9/2008 |
| KR | 10-2011-0017719 A | 2/2011 |
| KR | 10-2012-0038355 A | 4/2012 |
| KR | 10-2013-0006678 A | 1/2013 |
| WO | 2008/157269 A1 | 12/2008 |
| WO | 2011/128268 A1 | 10/2011 |

OTHER PUBLICATIONS

Communication dated Apr. 10, 2015, issued by the European Patent Office in counterpart European Application No. 12845496.4.
Communication dated May 26, 2015, issued by the Japanese Patent Office in counterpart Japanese Application No. 2014-539870.
International Preliminary Report on Patentability (PCT/IB/373) dated May 6, 2014 issued by the in International Searching Authority in counterpart International Patent Application No. PCT/KR2012/009074.
Marpe, Detlev et al.; "Context-Based Adaptive Binary Arithmetic Coding in the H.264/AVC Video Compression Standard"; IEEE Transactions on Circuits and Systems for Video Technology; vol. 13; No. 7; Jul. 2003; pp. 620-636.
"Method and Apparatus for Encoding Video, and Method and Apparatus for Decoding Video"; English translation of Korean Patent Application No. 10-2009-0075335 filed in the Korean Intellectual Property Office on Aug. 14, 2009; 51 pages total.
Sole, Joel et al.; "CE11: Unified scans for the significance map and coefficient level coding in high efficiency"; Joint Collaborative Team on Video Coding; JCTVC-F288; Jul. 14-22, 2011; pp. 1-5.
Joshi, Rajan; "BoG report on unified scans for the significance map and coefficient level coding in high efficiency (JCTVC-F288)"; Joint Collaborative Team on Video Coding, JCTVC-F753; Jul. 14-22, 2011; pp. 1-2.
Wiegand, Thomas; "Description of video coding technology proposal by Fraunhofer HHI", Joint Collaborative Team on Video Coding; JCTVC-A116; Apr. 15-23, 2010; pp. 1-44.
Wiegand, et al.; "WD3: Working Draft 3 of High-Efficiency Video Coding", Joint Collaborative Team on Video Coding (JCT-VC) of ITU-T SG16 WP3 and ISO/IEC JTC1/SC29/WG11, Mar. 2011, 215 pages total.
Communication dated Jul. 21, 2015, issued by the Korean Intellectual Property Office in counterpart Korean Application No. 10-2012-0122628.
Communication dated Jul. 21, 2015, issued by the Korean Intellectual Property Office in counterpart Korean Application No. 10-2015-0056888.
Communication dated Jul. 21, 2015, issued by the Korean Intellectual Property Office in counterpart Korean Application No. 10-2015-0056889.
Communication dated Nov. 20, 2015 issued by the Korean Intellectual Property Office in counterpart Korean Patent Application No. 10-2012-0122628.
Communication dated Nov. 20, 2015 issued by the Korean Intellectual Property Office in counterpart Korean Patent Application No. 10-2015-0056888.
Communication dated Nov. 20, 2015 issued by the Korean Intellectual Property Office in counterpart Korean Patent Application No. 10-2015-0056889.
Communication dated Nov. 20, 2015 issued by the Korean Intellectual Property Office in counterpart Korean Patent Application No. 10-2015-0056890.
Martin Winken et al.; "Description of Video Coding Technology Proposal by Fraunhofer HHI"; Joint Collaborative Team on Video Coding (JCT-VC) of ITU-T SG16 WP3 and ISO/IEC JTC1/SC29/WG11; Apr. 2010; 44 pages total.

* cited by examiner

CODING UNIT (1010)

FIG. 16

Subset (1600)

| 23 | 0 | 3 | 1 |
|----|---|---|---|
| 1  | 2 | 0 | 0 |
| 1  | 0 | 1 | 0 |
| 2  | 0 | 0 | 0 |

FIG. 17

SigMap (1700)

| 1 | 0 | 1 | 1 |
|---|---|---|---|
| 1 | 1 | 0 | 0 |
| 1 | 0 | 1 | 0 |
| 1 | 0 | 0 | 0 |

FIG. 18

GTR1 Flag (1800)

| 1 |   | 1 | 0 |
|---|---|---|---|
| 0 | 1 |   |   |
| 0 |   | 0 |   |
| 1 |   |   |   |

FIG. 19

GTR2 Flag (1900)

| 1 |  | 1 |  |
|---|---|---|---|
|  | 0 |  |  |
|  |  |  |  |
| 0 |  |  |  |

FIG. 20

ORDER OF PROCESSING (SCANNING ORDER) ←

| Coefficient | 23 | 1 | 0 | 1 | 2 | 3 | 2 | 0 | 0 | 1 | 0 | 1 |
|---|---|---|---|---|---|---|---|---|---|---|---|---|
| SIGMAP | 1 | 1 | 0 | 1 | 1 | 1 | 1 | 0 | 0 | 1 | 0 | 1 |
| GTR1 | 1 | 0 |  | 0 | 1 | 1 | 1 |  |  | 0 |  | 0 |
| GTR2 | 1 |  |  |  | 0 | 1 | 0 |  |  |  |  |  |
| Level-3 | 20 |  |  |  |  | 0 |  |  |  |  |  |  |

FIG. 27A
Context set

| Luma | | |
|---|---|---|
| Ctxset Luma (previous subset) | | |
| 0 | Sub-set 0 | No GreatT1 |
| 1 | | At least one GreatT1 |
| 2 | Other sub-sets | No GreatT1 |
| 3 | | At least one GreatT1 |
| Chroma | | |
| CtxSet_Chroma (previous subset) | | |
| 0 | | No GreatT1 |
| 1 | | At least one GreatT1 |

FIG. 27B
Offset in context set

| GT1 flag | |
|---|---|
| c1 (current subset) | |
| 0 | 1 or more GreatT1 |
| 1 | Initial – no trailing ones |
| 2 | 1 trailing one |
| 3 | 2 or more trailing ones |
| GT2 flag | |
| c2 (current subset) | |
| 0 | first greatT2 |

FIG. 28

| Coefficient | 23 | 1 | 0 | 1 | 2 | 3 | ②  | 0 | 0 | ① | 0 | ① |
|---|---|---|---|---|---|---|---|---|---|---|---|---|
| SIGMAP | 1 | 1 | 0 | 1 | 1 | 1 | 1 | 0 | 0 | 1 | 0 | 1 |
| GTR1 | 1 | 0 |  | 0 | 1 | 1 | 1 |  |  | 0 |  | 0 |
| GTR2 | 1 |  |  |  | 0 | 1 | 0 |  |  |  |  |  |
| Level-3 | 20 |  |  |  |  | 0 |  |  |  |  |  |  |
| C1 | 0 | 0 |  | 0 | 0 | 0 | 3 |  |  | 2 |  | 1 |

ORDER OF PROCESSING ← 2830   2820   2810

FIG. 29

| Coefficient | 23 | 1 | 0 | 1 | 2 | 3 | 2 | 0 | 0 | 1 | 0 | ② |
|---|---|---|---|---|---|---|---|---|---|---|---|---|
| SIGMAP | 1 | 1 | 0 | 1 | 1 | 1 | 1 | 0 | 0 | 1 | 0 | 1 |
| GTR1 | 1 | 0 |  | 0 | 1 | 1 | 1 |  |  | 0 |  | 1 |
| GTR2 | 1 |  |  |  | 0 | 1 | 0 |  |  |  |  | 0 |
| Level-3 | 20 |  |  |  |  | 0 |  |  |  |  |  |  |
| C1 | 0 | 0 |  | 0 | 0 | 0 | 0 |  |  | 0 |  | 1 |

ORDER OF PROCESSING ←   2910

METHOD AND APPARATUS FOR DETERMINING A CONTEXT MODEL FOR TRANSFORM COEFFICIENT LEVEL ENTROPY ENCODING AND DECODING

CROSS-REFERENCE TO RELATED APPLICATIONS

This application is a Continuation of U.S. application Ser. No. 14/355,439 filed Apr. 30, 2014, which is a National Stage Application under 35 U.S.C. §371 of International Application No. PCT/KR2012/009074 filed on Oct. 31, 2012, and claims the benefit of U.S. Provisional Application No. 61/553,668, filed on Oct. 31, 2011 and U.S. Provisional Application No. 61/671,955 filed on Jul. 16, 2012 in the United States Patent and Trademark Office, the disclosures of which are incorporated herein by reference in their entireties.

TECHNICAL FIELD

The present invention relates to encoding and decoding of video, and more particularly, to a method and apparatus for selecting a context model which is used in entropy encoding and decoding of size information of a transformation coefficient.

BACKGROUND ART

According to image compression methods such as MPEG-1, MPEG-2, or MPEG-4 H.264/MPEG-4 advanced video coding (AVC), an image is split into blocks having a predetermined size, and then, residual data of the blocks is obtained by inter prediction or intra prediction. Residual data is compressed by transformation, quantization, scanning, run length coding, and entropy coding. In entropy coding, a syntax element such as a transformation coefficient or a motion vector is entropy encoded to output a bit stream. At a decoder's end, a syntax element is extracted from a bit stream, and decoding is performed based on the extracted syntax element.

DISCLOSURE

Technical Problem

The technical problem to be solved by the present invention are removing unnecessary context models used in the entropy encoding and decoding of a transformation coefficient level and simplifying to reduce memory cost to store the context model.

The present invention also provides increasing the speed of an operation of selecting a context model and simplifying the operation without greatly decreasing the entropy encoding and decoding performance.

Technical Solution

The present invention provides a method and apparatus for selecting a context model which is used in entropy encoding and decoding of a transformation coefficient level, in which a context model used in entropy encoding and decoding of a transformation coefficient level is selected based on color information, a location of a subset including a transformation coefficient, and information of a continuous length of 1, or the like.

Advantageous Effects

According to the embodiments of the present invention, by using a reduced number of context models, the use amount of a memory for storing context models may be reduced, and entropy encoding and decoding of the transformation coefficient level may be performed without a great decrease in performance.

DESCRIPTION OF DRAWINGS

FIG. 16 illustrates a subset included in the transformation unit of FIG. 15, according to an embodiment of the present invention;

FIG. 17 illustrates a significant map corresponding to the subset of FIG. 16;

FIG. 18 illustrates a first critical value flag corresponding to the subset of FIG. 16;

FIG. 19 illustrates a second critical value flag corresponding to the subset of FIG. 16;

FIG. 20 is a table showing transformation coefficients included in a subset illustrated in FIGS. 16 through 19 and transformation coefficient information that is entropy encoded and decoded;

FIG. 27A illustrates a context set index ctxset for determining a context set used in entropy encoding and decoding of a first critical value flag Gtr1 flag and a second critical value flag Gtr2 flag of a significant transformation coefficient of a luminance component and a significant transformation coefficient of a chrominance component according to an embodiment of the present invention;

FIG. 27B illustrates a context offset used in entropy encoding and decoding of a first critical value flag Gtr1 flag and a second critical value flag Ctr1 flag, according to an embodiment of the present invention;

FIG. 28 illustrates a table showing a context offset index c1 that is used in entropy encoding or decoding of the transformation coefficients included in a subset and the transformation coefficient information that is entropy encoded or decoded, of FIG. 20, according to an embodiment of the present invention; and FIG. 29 illustrates a table showing a context offset index c1 used in entropy encoding and decoding of transformation coefficients included in a subset and transformation coefficient information that is entropy encoded or decoded, according to another embodiment of the present invention.

BEST MODE

Figure 1:
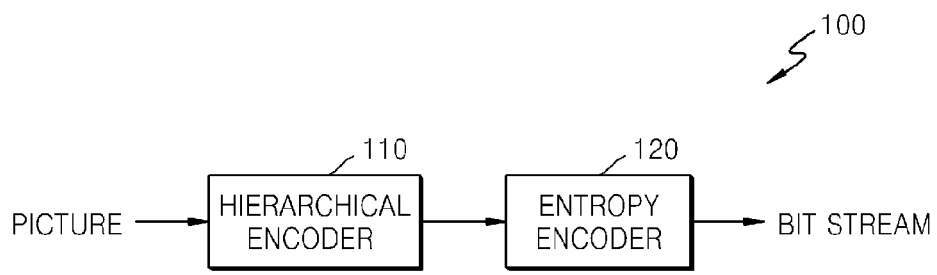
FIG. 1 is a block diagram of an apparatus for encoding a video, according to an embodiment of the present invention.

According to an aspect of the present invention, there is provided a method of determining a context model for entropy encoding and decoding of a transformation coefficient level, the method comprising: splitting a transformation unit into subsets having a predetermined size and obtaining a significant transformation coefficient that is included in each of the subsets and is not 0; obtaining a context set index for determining a context set used in entropy encoding and decoding of a first critical value flag indicating whether the significant transformation coefficient from among a plurality of context sets including a plurality of contexts has a value greater than a first critical value, based on color component information of a transformation unit, location information of a first subset in which the significant transformation coefficient is included, and whether there is a significant transformation coefficient having a value greater than the first critical value in a second subset that is processed before the first subset; obtaining a context offset for determining one of a plurality of contexts included in a context set used in entropy encoding and decoding of the first critical value flag based on a length of a previous transformation coefficient having consecutive 1s; and obtaining a context index indicating a context used in entropy encoding or decoding of the first critical value flag by using the context set index and the context offset.

According to another aspect of the present invention, there is provided an apparatus for determining a context model for entropy encoding and decoding of a transformation coefficient level, comprising: a mapping unit that splits a transformation unit into subsets having a predetermined size and obtains a significant transformation coefficient that is included in each of the subsets and is not 0; a context set obtaining unit obtaining a context set index for determining a context set used in entropy encoding and decoding of a first critical value flag indicating whether the significant transformation coefficient from among a plurality of context sets including a plurality of contexts has a value greater than a first critical value, based on color component information of a transformation unit, location information of a first subset in which the significant transformation coefficient is included, and whether there is a significant transformation coefficient having a value greater than the first critical value in a second subset that is processed before the first subset; a context offset obtaining unit obtaining a context offset for determining one of a plurality of contexts included in a context set used in entropy encoding and decoding of the first critical value flag based on a length of a previous transformation coefficient having consecutive 1s; and a context determining unit obtaining a context index indicating a context used in entropy encoding or decoding of the first critical value flag by using the context set index and the context offset.

MODE FOR INVENTION

Hereinafter, an "image" described in various embodiments of the present application may be an inclusive concept referring to not only a still image but a video image.

When various operations are performed on data related to an image, the data related to the image is split into data groups, and the same operation may be performed on data included in the same data group. In this specification, a data group formed according to predetermined standards is referred to as a 'data unit' Hereinafter, an operation performed on each 'data unit' is understood as performed using data included in a data unit.

Hereinafter, a method and apparatus for encoding and decoding of video in which a syntax element having a tree structure is encoded or decoded based on a coding unit having a hierarchical tree structure, according to an embodiment of the present invention, will be described with reference to FIGS. 1 through 13. In addition, the method of entropy encoding and decoding used in the encoding and decoding of video described with reference to FIGS. 1 through 13 will be described in detail with reference to FIGS. 14 through 29.

FIG. 1 is a block diagram of a video encoding apparatus 100 according to an embodiment of the present invention.

The video encoding apparatus 100 includes a hierarchical encoder 110 and an entropy encoder 120.

The hierarchical encoder 110 may split a current picture to be encoded, in units of predetermined data units to perform encoding on each of the data units. In detail, the hierarchical encoder 110 may split a current picture based on a maximum coding unit, which is a coding unit of a maximum size. The maximum coding unit according to an embodiment of the present invention may be a data unit having a size of 32×32, 64×64, 128×128, 256×256, etc., wherein a shape of the data unit is a square which has a width and length in squares of 2 and is greater than 8.

A coding unit according to an embodiment of the present invention may be characterized by a maximum size and a depth. The depth denotes the number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, image data of the current picture is split into the maximum coding units according to a maximum size of the coding unit, and each of the maximum coding units may include deeper coding units that are split according to depths. Since the maximum coding unit according to an embodiment of the present invention is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The hierarchical encoder 110 encodes at least one split region obtained by splitting a region of the maximum coding unit according to depths, and determines a depth to output finally encoded image data according to the at least one split region. In other words, the hierarchical encoder 110 determines a coded depth by encoding the image data in the deeper coding units according to depths, according to the maximum coding unit of the current picture, and selecting a depth having the least encoding error. The determined coded depth and the encoded image data according to maximum encoding units are output to the entropy encoder 120.

The image data in the maximum coding unit is encoded based on the deeper coding units corresponding to at least one depth equal to or smaller than the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths, and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the hierarchical encoder 110 may determine coding units having a tree structure included in the maximum coding unit. The 'coding units having a tree structure' according to an embodiment of the present invention include coding units corresponding to a depth determined to be the coded depth, from among all deeper coding units included in the maximum coding unit. A coding unit having a coded depth may be hierarchically determined according to depths in the same region of the maximum coding unit, and may be independently determined in different regions. Similarly, a coded depth in a current region may be independently determined from a coded depth in another region.

A maximum depth according to an embodiment of the present invention is an index related to the number of times splitting is performed from a maximum coding unit to a minimum coding unit. A first maximum depth according to an embodiment of the present invention may denote the total number of times splitting is performed from the maximum coding unit to the minimum coding unit. A second maximum depth according to an embodiment of the present invention may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, five depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having the least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and transformation. Accordingly, the hierarchical encoder 110 not only determines a coded depth having the least encoding error, but also determines a partition type in a prediction unit, a prediction mode according to prediction units, and a size of a transformation unit for transformation.

Coding units according to a tree structure in a maximum coding unit and a method of determining a partition, according to embodiments of the present invention, will be described in detail later with reference to FIGS. 3 through 12.

The hierarchical encoder 110 may measure an encoding error of deeper coding units according to depths by using Rate-Distortion Optimization based on Lagrangian multipliers.

The entropy encoder 120 outputs the image data of the maximum coding unit, which is encoded based on the at least one coded depth determined by the hierarchical encoder 110, and information about the encoding mode according to the coded depth, in bit streams. The encoded image data may be a coding result of residual data of an image. The information about the encoding mode according to the coded depth may include information about the coded depth, information about the partition type in the prediction unit, prediction mode information, and size information of the transformation unit. In particular, as will be described later, the entropy encoder 120 may obtain a context set index indicating one of a plurality of context sets based on whether a significant transformation coefficient having a greater value than a first critical value exists in color component information of a transformation unit, a location of a current subset, and a previous subset, so as to obtain a context offset based on a length of a previous transformation coefficient having consecutive 1s. In addition, the entropy encoder 120 determines a context index ctdldx indicating a context model that is to be applied to a first critical value flag Greaterthan1 flag indicating whether the significant transformation coefficient is greater than a first critical value, that is, 1, and a second critical value flag Greaterthan2 flag indicating whether the significant transformation coefficient is greater than a second critical value, that is, 2, based on the obtained context set index and the obtained context offset. The operation of determining a context model for entropy encoding of transformation coefficients to be performed by the entropy encoder 120 will be described later.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the entropy encoder 120 may assign encoding information about a corresponding coded depth and an encoding mode to at least one of the coding unit, the prediction unit, and a minimum unit included in the maximum coding unit.

The minimum unit according to an embodiment of the present invention is a square-shaped data unit obtained by splitting the minimum coding unit constituting the lowermost depth by 4. Alternatively, the minimum unit may be a maximum square-shaped data unit that may be included in all of the coding units, prediction units, partition units, and transformation units included in the maximum coding unit.

For example, the encoding information output through the entropy encoder 120 may be classified into encoding information according to deeper coding units according to depths and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bit stream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of four coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. Therefore, by using the video encoding apparatus 100, image compression efficiency may be increased since a coding unit is adjusted while considering characteristics of an image while increasing a maximum size of a coding unit while considering a size of the image.

Figure 2:
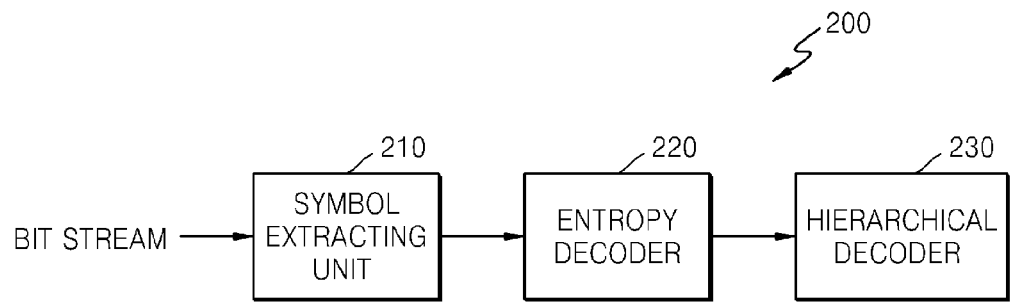
FIG. 2 is a block diagram of an apparatus for decoding a video, according to an embodiment of the present invention.

FIG. 2 is a block diagram of a video decoding apparatus 200 according to an embodiment of the present invention.

The video decoding apparatus 200 includes a syntax element extracting unit 210, an entropy decoder 220, and a hierarchical decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The syntax element extracting unit 210 receives and parses a bitstream of an encoded video. The entropy decoder 220 extracts encoded image data for each coding unit from the parsed bitstream, wherein the coding units have a tree structure according to each maximum coding unit, and outputs the extracted image data to the hierarchical decoder 230.

Also, the entropy decoder 220 extracts information about a coded depth, an encoding mode, color component information, prediction mode information, etc. for the coding units having a tree structure according to each maximum coding unit, from the parsed bitstream. The extracted information about the coded depth and the encoding mode is output to the hierarchical decoder 230. The image data in a bit stream is split into the maximum coding unit so that the hierarchical decoder 230 may decode the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the entropy decoder 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the entropy decoder 220 may extract the information about the coded depth and the encoding mode according to the predetermined data units. The predetermined data units to which the same information about the coded depth and the encoding mode is assigned may be inferred to be the data units included in the same maximum coding unit.

Also, as will be described later, the entropy decoder 220 may obtain a context set index indicating one of a plurality of context sets based on whether a significant transformation coefficient having a greater value than a first critical value exists in color component information of a transformation unit, a location of a current subset, and a previous subset, so as to obtain a context offset based on a length of a previous transformation coefficient having consecutive 1s. In addition, the entropy decoder 220 determines a context index ctdIdx indicating a context model that is to be applied to a first critical value flag Greaterthan1 flag indicating whether the significant transformation coefficient is greater than a first critical value, that is, 1, and a second critical value flag Greaterthan2 flag indicating whether the significant transformation coefficient is greater than a second critical value, that is, 2, based on the obtained context set index and the obtained context offset.

The hierarchical decoder 230 restores the current picture by decoding the image data in each maximum coding unit based on the information about the coded depth and the encoding mode according to the maximum coding units. In other words, the hierarchical decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The hierarchical decoder 230 may perform intra prediction or motion compensation according to a partition and a prediction mode of each coding unit, based on the information about the partition type and the prediction mode of the prediction unit of the coding unit according to coded depths.

Also, the hierarchical decoder 230 may perform inverse transformation according to each transformation unit in the coding unit, based on the information about the size of the transformation unit of the coding unit according to coded depths, so as to perform the inverse transformation according to maximum coding units.

The hierarchical decoder 230 may determine at least one coded depth of a current maximum coding unit by using split information according to depths. If the split information indicates that image data is no longer split in the current depth, the current depth is a coded depth. Accordingly, the hierarchical decoder 230 may decode the coding unit of the current depth with respect to the image data of the current maximum coding unit by using the information about the partition type of the prediction unit, the prediction mode, and the size of the transformation unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the hierarchical decoder 230 in the same encoding mode.

The video decoding apparatus 200 may obtain information about at least one coding unit that generates the minimum encoding error when encoding is recursively performed for each maximum coding unit, and may use the information to decode the current picture. In other words, encoded image data of the coding units having the tree structure determined to be the optimum coding units in each maximum coding unit may be decoded.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an embodiment of the present invention, will now be described with reference to FIGS. 3 through 13.

Figure 3:
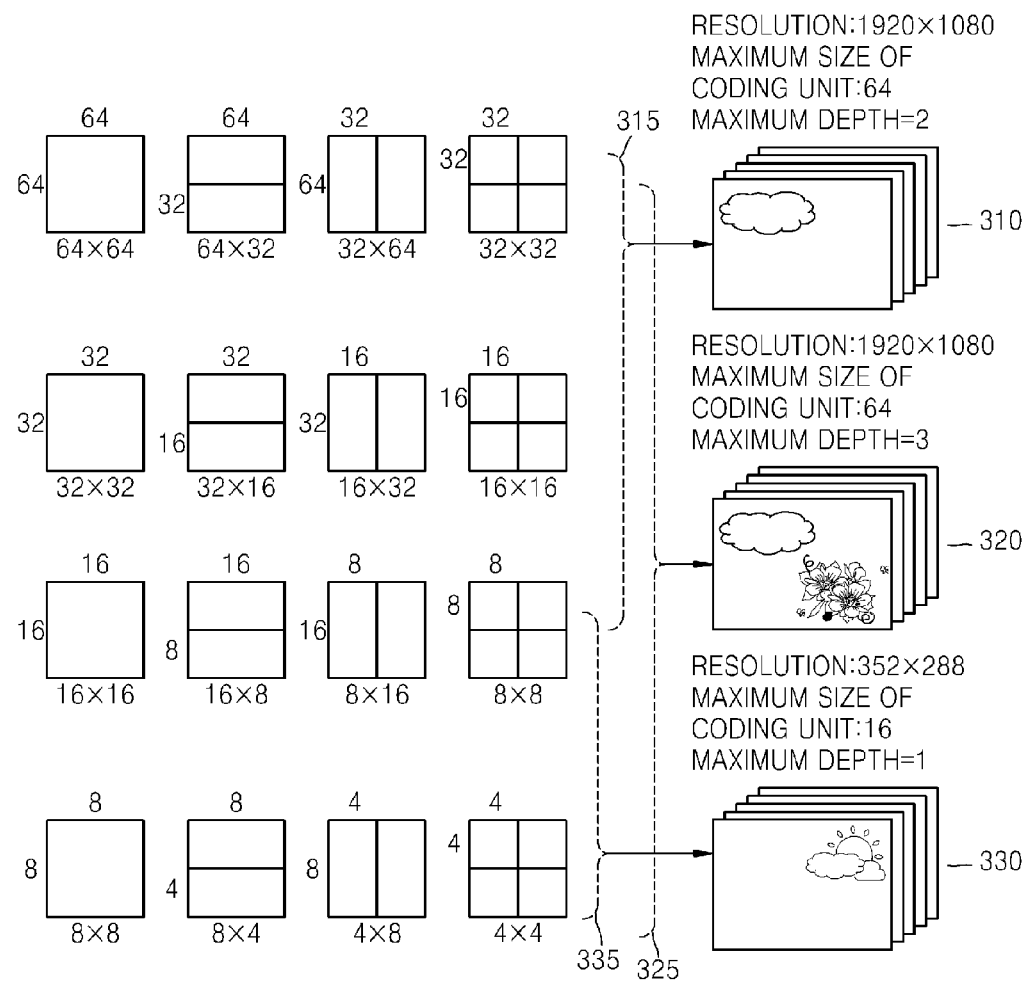
FIG. 3 is a diagram for describing a concept of coding units according to an embodiment of the present invention.

FIG. 3 is a diagram for describing a concept of coding units according to an embodiment of the present invention.

A size of a coding unit may be expressed in width×height, and may be 64×64, 32×32, 16×16, and 8×8. A coding unit of 64×64 may be split into partitions of 64×64, 64×32, 32×64, or 32×32; and a coding unit of 32×32 may be split into partitions of 32×32, 32×16, 16×32, or 16×16; a coding unit of 16×16 may be split into partitions of 16×16, 16×8, 8×16, or 8×8; and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
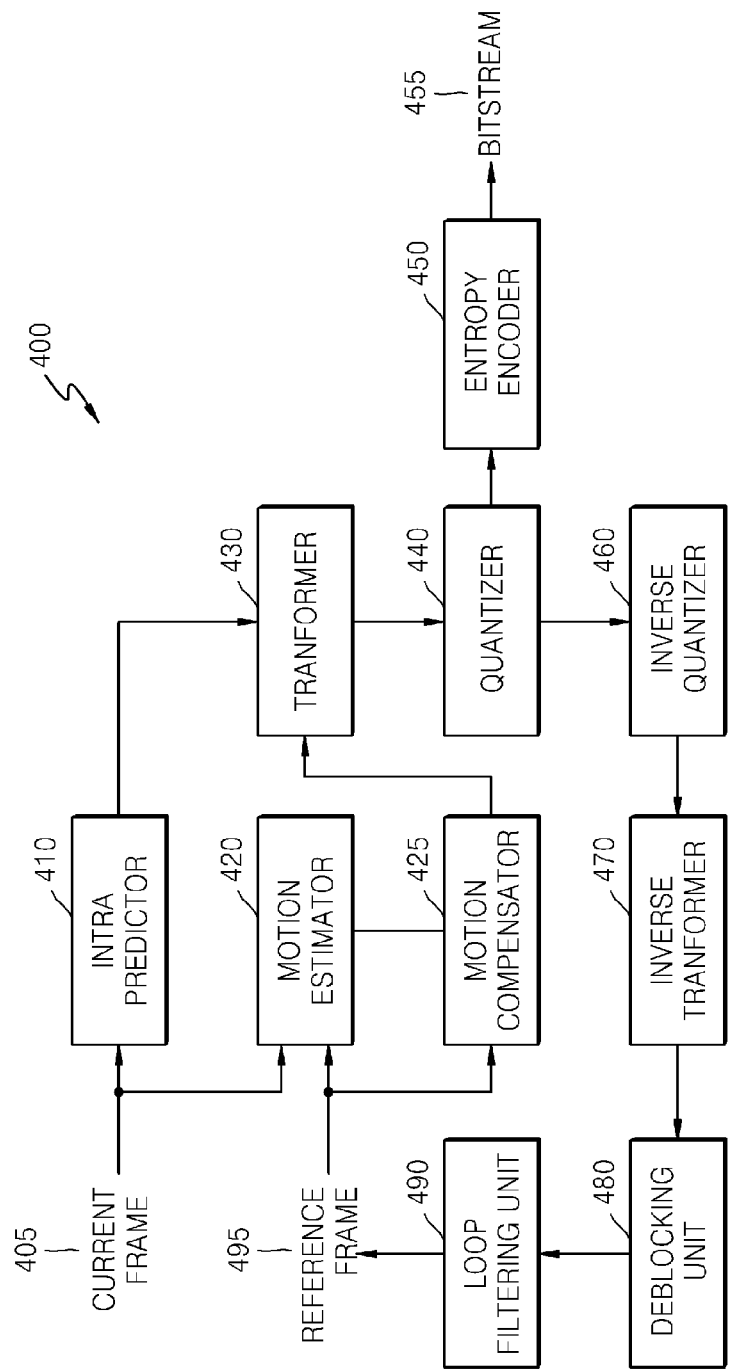
FIG. 4 is a block diagram of a video encoder based on coding units having a hierarchical structure, according to an embodiment of the present invention.

FIG. 4 is a block diagram of a video encoder 400 based on coding units having a hierarchical structure, according to an embodiment of the present invention.

An intra predictor 410 performs intra prediction on coding units in an intra mode, with respect to a current frame 405, and a motion estimator 420 and a motion compensator 425 respectively perform inter estimation and motion compensation on coding units in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

When encoding syntax elements of a transformation unit such as a first critical value flag Gtr1 flag or a second critical value flag Gtr2 flag, the entropy encoder 450 obtains a context set index based on whether there is a significant transformation coefficient having a greater value than a first critical value in color component information of a transformation unit, a location of a current subset, and a previous subset, obtains a context offset based on a length of a previous transformation coefficient having consecutive 1s, and determines a context index indicating a context model based on the obtained context set index and the obtained context offset.

In order for the video encoder 400 to be applied in the video encoding apparatus 100, all elements of the video encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
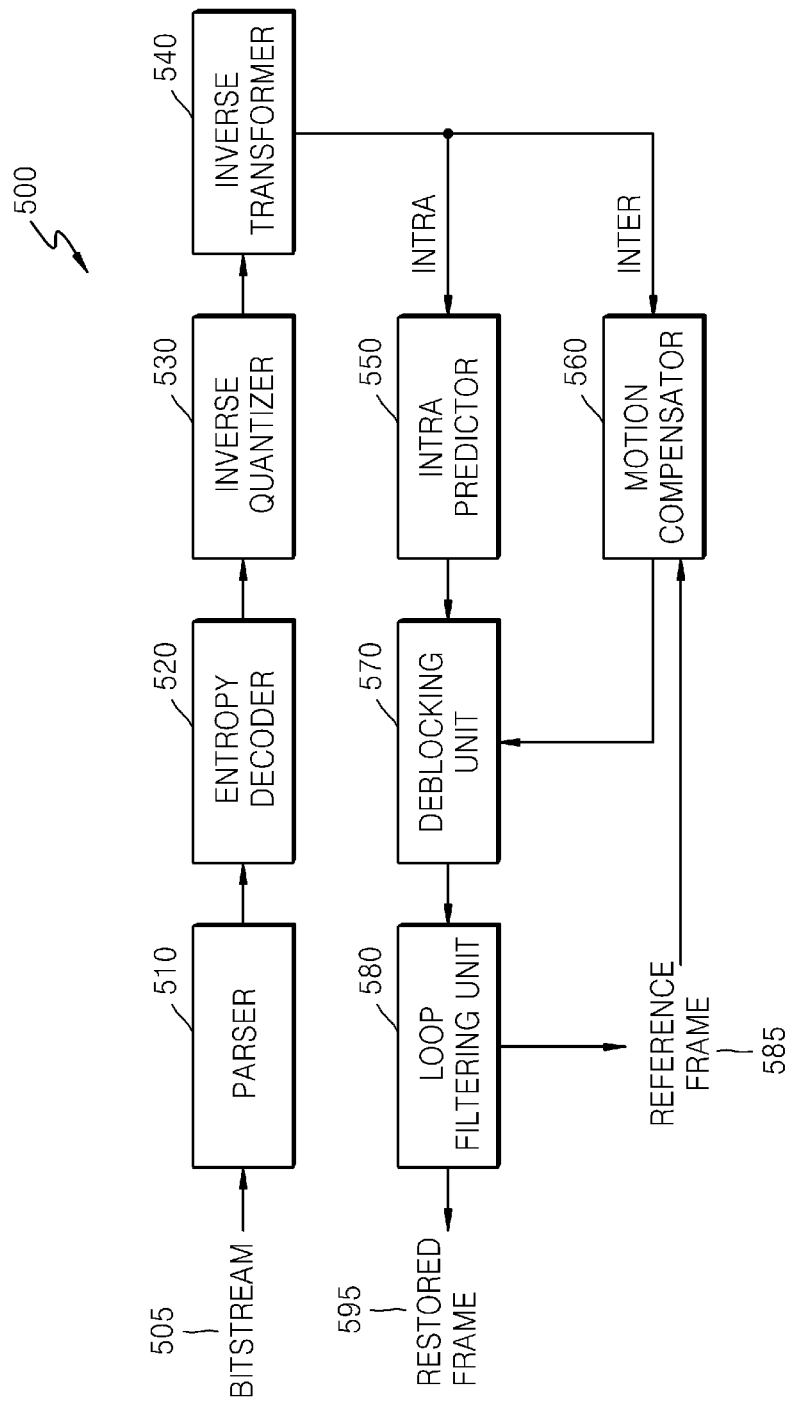
FIG. 5 is a block diagram of a video decoder based on coding units having a hierarchical structure, according to an embodiment of the present invention.

FIG. 5 is a block diagram of a video decoder 500 based on coding units, according to an embodiment of the present invention.

A parser 510 parses encoded image data to be decoded and information about encoding required for decoding, from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data, which is post-processed through the deblocking unit 570 and the loop filtering unit 580, may be output as the reference frame 585.

In order for the video decoder 500 to be applied in the video decoding apparatus 200, all elements of the video decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

The intra predictor 550 and the motion compensator 560 determine a partition and a prediction mode for each coding unit having a tree structure, and the inverse transformer 540 has to determine a size of a transformation unit for each coding unit. Also, when decoding syntax elements of a transformation unit such as a first critical value flag Gtr1 flag or a second critical value flag Gtr2 flag, the entropy decoder 520 obtains a context set index based on whether there is a significant transformation coefficient having a greater value than a first critical value in color component information of a transformation unit, a location of a current subset, and a previous subset, obtains a context offset based on a length of a previous transformation coefficient having consecutive 1s, and determines a context index indicating a context model based on the obtained context set index and the obtained context offset.

Figure 6:
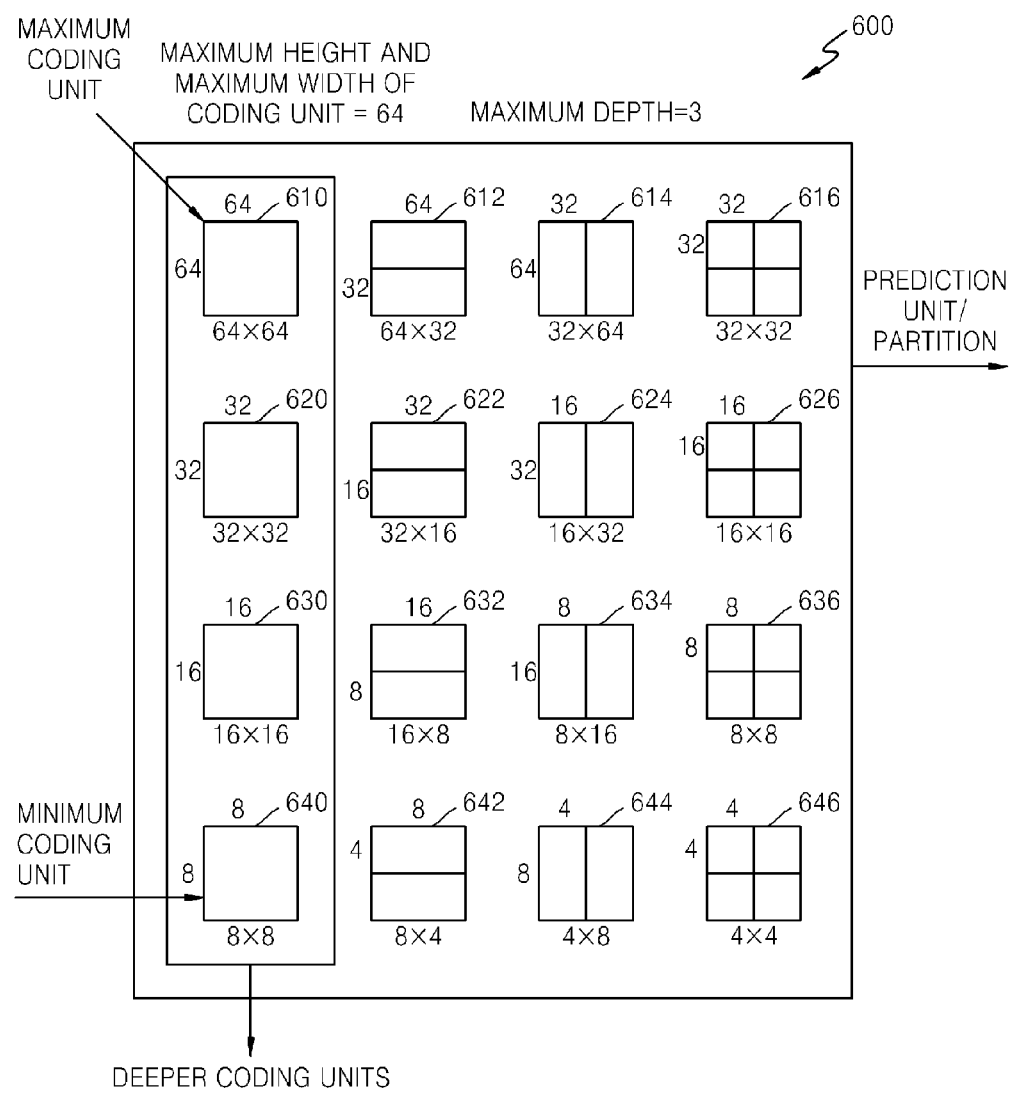
FIG. 6 is a diagram illustrating deeper coding units according to depths, and partitions, according to an embodiment of the present invention.

FIG. 6 is a diagram illustrating deeper coding units according to depths, and partitions, according to an embodiment of the present invention.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to an embodiment of the present invention, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the encoding unit determining unit (120) of the video encoding apparatus 100 performs encoding for coding units corresponding to each depth included in the maximum coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
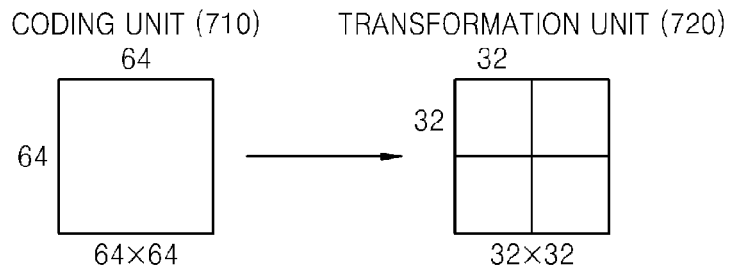
FIG. 7 is a diagram for describing a relationship between a coding unit and transformation units, according to an embodiment of the present invention.

FIG. 7 is a diagram for describing a relationship between a coding unit 710 and transformation units 720, according to an embodiment of the present invention.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
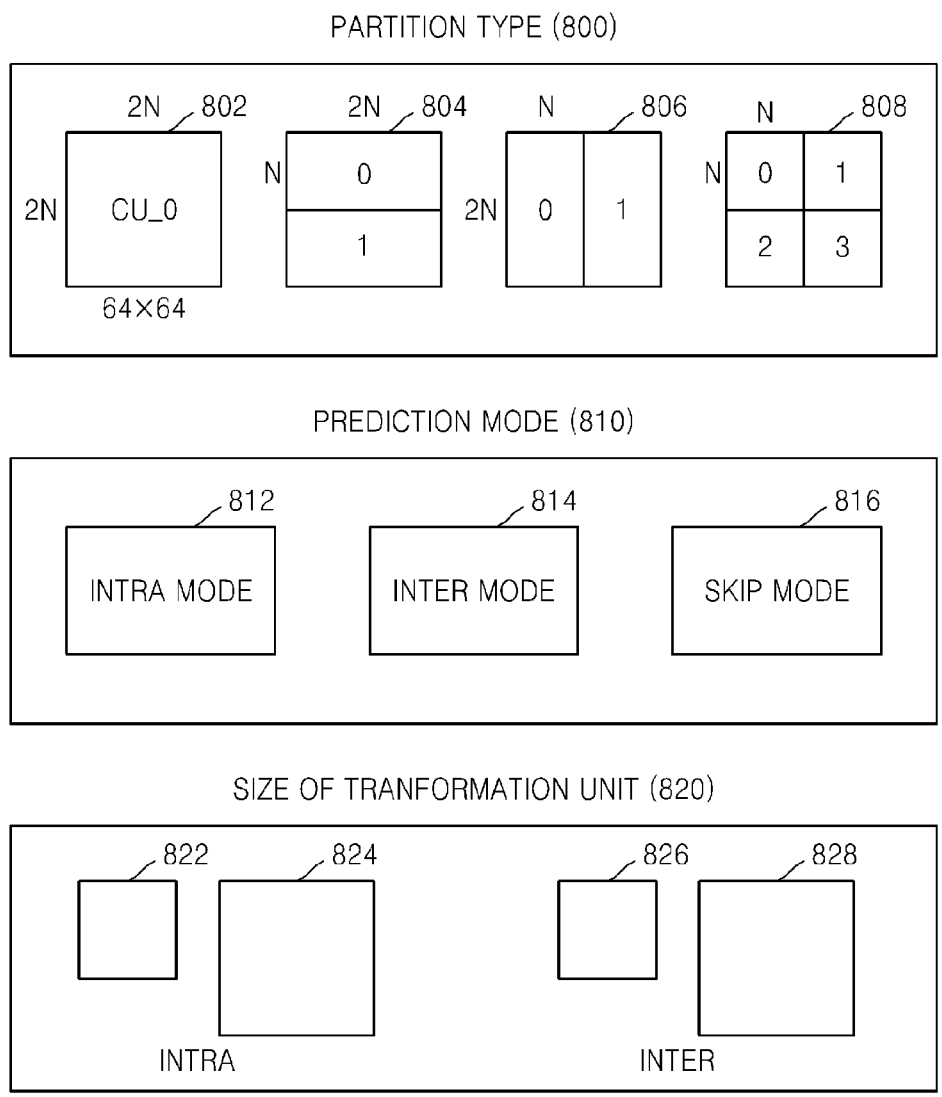
FIG. 8 is a diagram for describing encoding information of coding units corresponding to a coded depth, according to an embodiment of the present invention.

FIG. 8 is a diagram for describing encoding information of coding units corresponding to a coded depth, according to an embodiment of the present invention.

An output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The entropy decoder 220 of the video decoding apparatus 200 may extract and use the information 800, 810, and 820 for decoding, according to each deeper coding unit.

Figure 9:
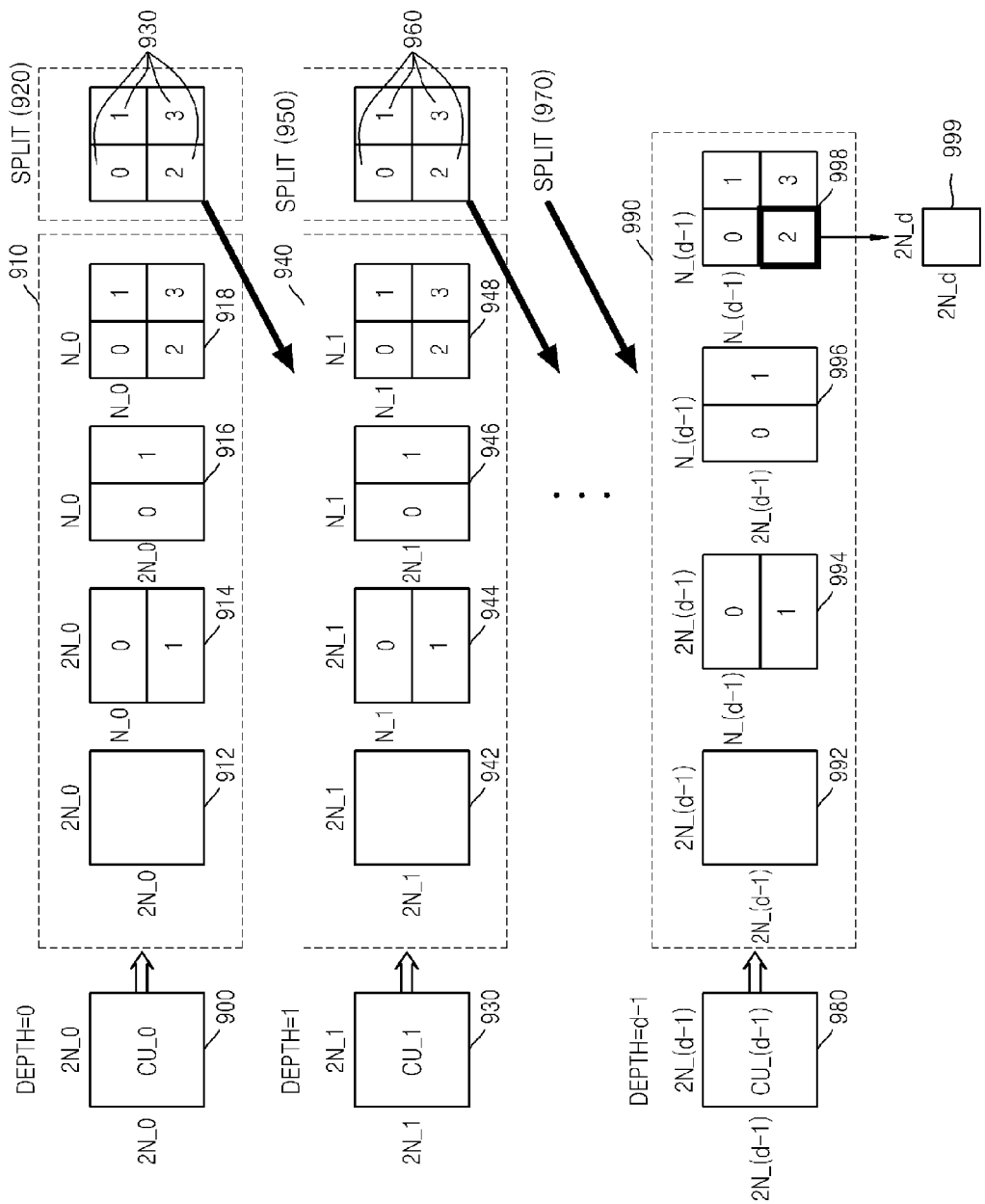
FIG. 9 is a diagram of deeper coding units according to depths, according to an embodiment of the present invention.

FIG. 9 is a diagram of deeper coding units according to depths, according to an embodiment of the present invention.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_×2N_0, 2N_0×N_0, and N_0×N_0. The prediction encoding in a skip mode is performed only on the partition having the size of 2N_0×2N_0.

If an encoding error is the smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on partition type coding units having a depth of 2 and a size of N_0×N_0 to search for a minimum encoding error.

A prediction unit 940 for prediction encoding of the (partition type) coding unit 930 having a depth of 1 and a size of 2N_1×2N_1(=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split to a lower depth, and a coded depth for the coding units constituting the current maximum coding unit 900 is determined to be d−1 and a partition type of the current maximum coding unit 900 may be determined to be N_(d−1)×N_(d−1). Also, since the maximum depth is d, split information for the encoding unit 952 of the depth d−1 is not set.

A data unit 999 may be a 'minimum unit' for the current maximum coding unit. A minimum unit according to an embodiment of the present invention may be a rectangular data unit obtained by splitting the minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The entropy decoder 220 of the video decoding apparatus 200 may extract and use the information about the coded depth and the prediction unit of the coding unit 900 to decode the coding unit 912. The video decoding apparatus 200 may determine a depth, in which split information is 0, as a coded depth by using split information according to depths, and use information about an encoding mode of the corresponding depth for decoding.

Figure 10:
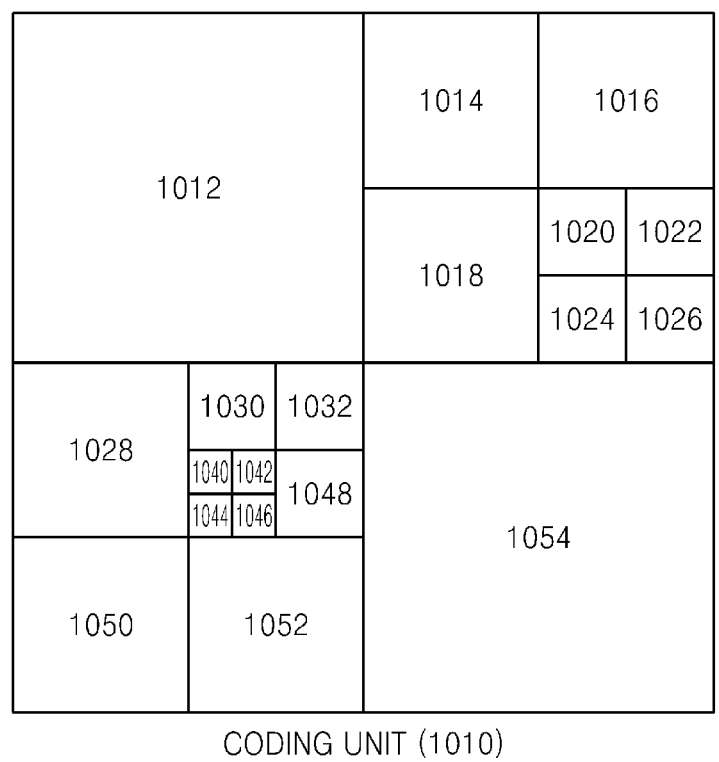
FIGS. 10 through 12 are diagrams for describing a relationship between coding units, prediction units, and frequency transformation units, according to an embodiment of the present invention.
Figure 11:
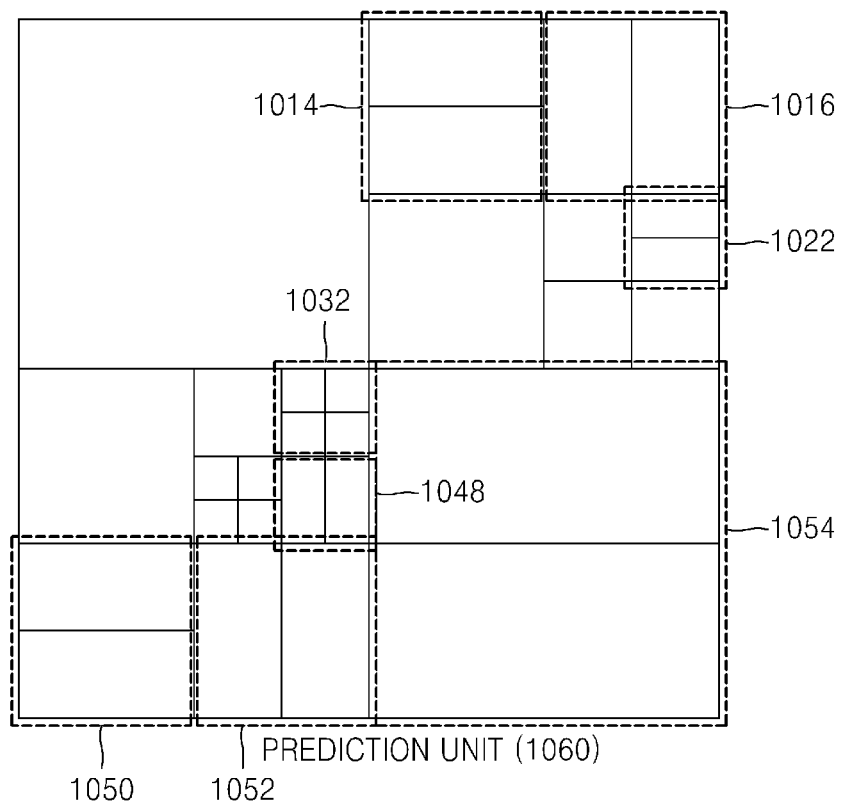
Figure 12:
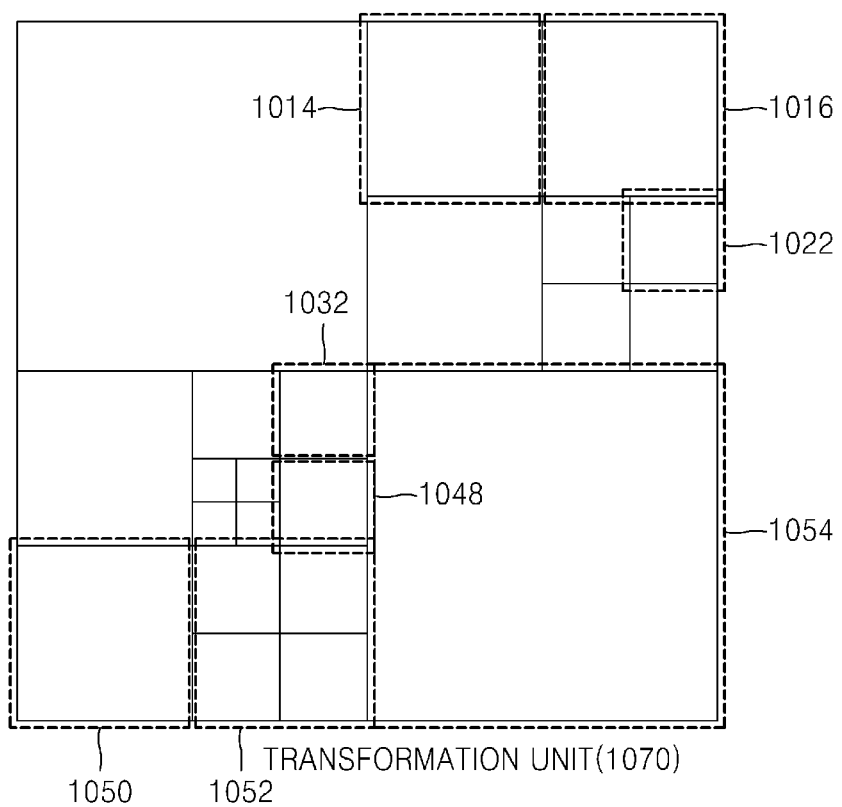

FIGS. 10 through 12 are diagrams for describing a relationship between coding units 1010, prediction units 1060, and transformation units 1070 according to an embodiment of the present invention.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1070 are different from those in the prediction units 1060 in terms of sizes and shapes. In other words, the video encoding apparatus 100 and the video decoding apparatus 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 and the video decoding apparatus 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The entropy encoder 120 of the video encoding apparatus 100 may output the encoding information about the coding units having a tree structure, and the entropy decoder 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:n and n:1 (where n is an integer greater than 1), and the asymmetrical partition types having the sizes of nL×2N and nR×2N may be respectively obtained by splitting the width of the prediction unit in 1:n and n:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
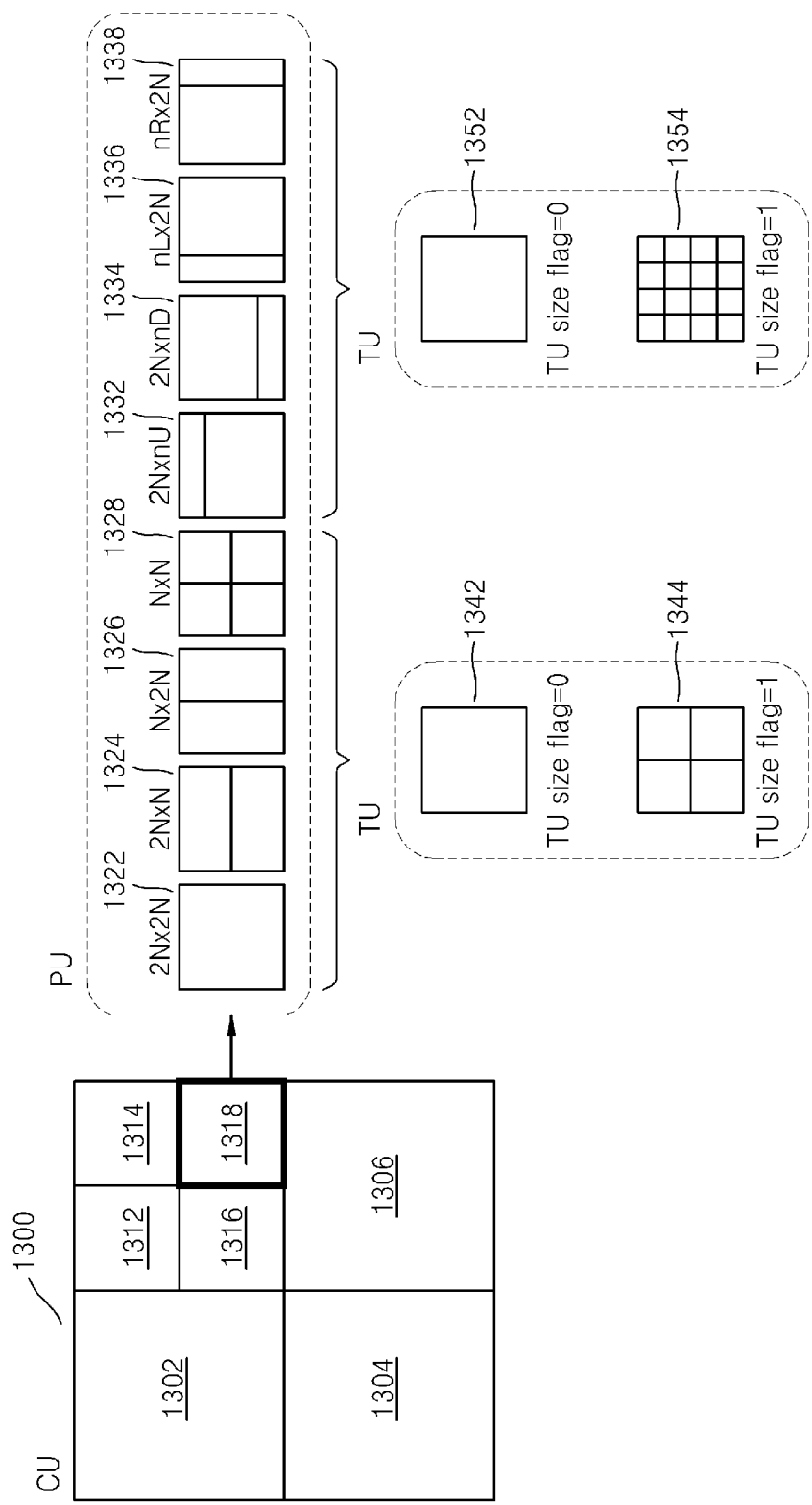
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

The TU size flag is a type of transformation index; a size of a transformation unit corresponding to a transformation index may be modified according to a prediction unit type or a partition type of a coding unit.

When the partition type is set to be symmetrical, i.e. the partition type 1322, 1324, 1326, or 1328, the transformation unit 1342 having a size of 2N×2N is set if a TU size flag of a transformation unit is 0, and the transformation unit 1344 having a size of N×N is set if a TU size flag is 1.

When the partition type is set to be asymmetrical, i.e., the partition type 1332 (2N×nU), 1334 (2N×nD), 1336 (nL×2N), or 1338 (nR×2N), the transformation unit 1352 having a size of 2N×2N is set if a TU size flag is 0, and the transformation unit 1354 having a size of N/2×N/2 is set if a TU size flag is 1.

Referring to FIG. 13, the TU size flag described above is a flag having a value of 0 or 1, but the TU size flag is not limited to 1 bit, and a transformation unit may be hierarchically split while the TU size flag increases from 0. The transformation unit split information (TU size flag) may be used as an example of a transformation index.

In this case, when a TU size flag according to an embodiment is used with a maximum size and a minimum size of a transformation unit, the size of the actually used transformation unit may be expressed. The video encoding apparatus 100 may encode maximum transformation unit size information, minimum transformation unit size information, and maximum transformation unit split information. The encoded maximum transformation unit size information, minimum transformation unit size information, and maximum transformation unit split information may be inserted into a sequence parameter set (SPS). The video decoding apparatus 200 may use the maximum transformation unit size information, the minimum transformation unit size information, and the maximum transformation unit split information for video decoding.

For example, (a) if a size of a current coding unit is 64×64 and a maximum transformation unit is 32×32, (a-1) a size of a transformation unit is 32×32 if a TU size flag is 0; (a-2) a size of a transformation unit is 16×16 if a TU size flag is 1; and (a-3) a size of a transformation unit is 8×8 if a TU size flag is 2.

Alternatively, (b) if a size of a current coding unit is 32×32 and a minimum transformation unit is 32×32, (b-1) a size of a transformation unit is 32×32 if a TU size flag is 0, and since the size of a transformation unit cannot be smaller than 32×32, no more TU size flags may be set.

Alternatively, (c) if a size of a current encoding unit is 64×64 and a maximum TU size flag is 1, a TU size flag may be 0 or 1 and no other TU size flags may be set.

Accordingly, when defining a maximum TU size flag as 'MaxTransformSizeIndex', a minimum TU size flag as 'MinTransformSize', and a transformation unit in the case when a TU size flag is 0, that is, a basic transformation unit RootTu as 'RootTuSize', a size of a minimum transformation unit 'CurrMinTuSize', which is available in a current coding unit, may be defined by Equation (1) below.

$$CurrMinTuSize = \max(MinTransformSize, RootTuSize/(2^{MaxTransformSizeIndex})) \quad (1)$$

In comparison with the size of the minimum transformation unit 'CurrMinTuSize' that is available in the current coding unit, the basic transformation unit size 'RootTuSize', which is a size of a transformation unit when if a TU size flag is 0, may indicate a maximum transformation unit which may be selected in regard to a system. That is, according to Equation (1), 'RootTuSize/(2^MaxTransformSizeIndex)' is a size of a transformation unit that is obtained by splitting 'RootTuSize', which is a size of a transformation unit when transformation unit split information is 0, by the number of splitting times corresponding to the maximum transformation unit split information, and 'MinTransformSize' is a size of a minimum transformation unit, and thus a smaller value of these may be 'CurrMinTuSize' which is the size of the minimum transformation unit that is available in the current coding unit.

The size of the basic transformation unit 'RootTuSize' according to an embodiment of the present invention may vary according to a prediction mode.

For example, if a current prediction mode is an inter mode, RootTuSize may be determined according to Equation (2) below. In Equation (2), 'MaxTransformSize' refers to a maximum transformation unit size, and 'PUSize' refers to a current prediction unit size.

$$RootTuSize=\min(MaxTransformSize, PUSize) \quad (2)$$

In other words, if a current prediction mode is an inter mode, the size of the basic transformation unit size 'Root-TuSize', which is a transformation unit if a TU size flag is 0, may be set to a smaller value from among the maximum transformation unit size and the current prediction unit size.

If a prediction mode of a current partition unit is an intra mode, 'RootTuSize' may be determined according to Equation (3) below. 'PartitionSize' refers to a size of the current partition unit.

$$RootTuSize=\min(MaxTransformSize, PartitionSize) \quad (3)$$

In other words, if a current prediction mode is an intra mode, the basic transformation unit size 'RootTuSize' may be set to a smaller value from among the maximum transformation unit size and the current partition unit size.

However, it should be noted that the size of the basic transformation unit size 'RootTuSize', which is the current maximum transformation unit size according to an embodiment of the present invention and varies according to a prediction mode of a partition unit, is an example, and factors for determining the current maximum transformation unit size are not limited thereto.

Hereinafter, an entropy encoding operation of a syntax element, which is performed in the entropy encoder 120 of the video encoding apparatus 100 of FIG. 1, and an entropy decoding operation of a syntax element, which is performed in the entropy decoder 220 of the video decoding apparatus 200 of FIG. 2 will be described in detail.

As described above, the video encoding apparatus 100 and the video decoding apparatus 200 perform encoding and decoding by splitting a maximum coding unit into coding units that are smaller than or equal to a maximum coding unit. A prediction unit and a transformation unit used in prediction and transformation may be determined based on costs independently from other data units. Since an optimum coding unit may be determined by recursively encoding each coding unit having a hierarchical structure included in the maximum coding unit, data units having a tree structure may be configured. In other words, for each maximum coding unit, a coding unit having a tree structure, and a prediction unit and a transformation unit each having a tree structure may be configured. For decoding, hierarchical information, which is information indicating structure information of data units having a hierarchical structure and non-hierarchical information for decoding, besides the hierarchical information, needs to be transmitted.

The information related to a hierarchical structure is information needed for determining a coding unit having a tree structure, a prediction unit having a tree structure, and a transformation unit having a tree structure, as described above with reference to FIGS. 10 through 12, and includes a transformation unit split flag (TU size flag) indicating a size of a maximum coding unit, coded depth, partition information of a prediction unit, a split flag indicating whether a coding unit is split or not, size information of a transformation unit, and a transformation unit split flag (TU size flag) indicating whether a transformation unit is split or not. Examples of coding information other than hierarchical structure information include prediction mode information of intra/inter prediction applied to each prediction unit, motion vector information, prediction direction information, color component information applied to each data unit in the case when a plurality of color components are used, and transformation coefficient information. Hereinafter, hierarchical information and extra-hierarchical information may be referred to as a syntax element which is to be entropy encoded or entropy decoded.

In particular, according to the embodiments of the present invention, a method of determining a context model for efficiently entropy encoding and decoding a level of a transformation coefficient, that is, size information of syntax elements is provided. Hereinafter, a method of determining a context model for entropy encoding and decoding of a level of a transformation coefficient will be described in detail.

Figure 14:
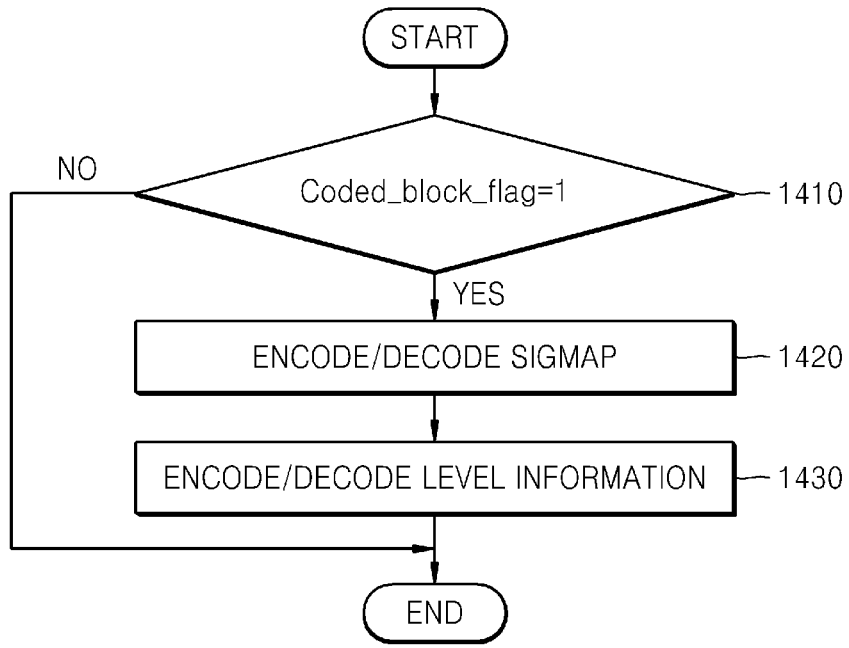
FIG. 14 is a flowchart illustrating an operation of entropy encoding and decoding of transformation coefficient information included in a transformation unit, according to an embodiment of the present invention.

FIG. 14 is a flowchart illustrating an operation of entropy encoding and decoding of transformation coefficient information included in a transformation unit, according to an embodiment of the present invention.

Referring to FIG. 14, coded_block_flag indicating whether a transformation coefficient which is not 0 (hereinafter, referred to as "significant coefficient") exists or not from among transformation coefficients included in a current transformation unit is first entropy encoded or decoded in operation 1410.

If coded_block_flag is 0, there are only transformation coefficients of 0 in the current transformation unit, and thus only a value 0 is entropy encoded or decoded as coded_block_flag, and transformation coefficient level information is not entropy encoded or decoded.

In operation 1420, if there is a significant coefficient in the current transformation unit, a significance map SigMap indicating a location of a significant coefficient is entropy encoded or decoded.

A significance map SigMap may be formed of a significant bit and predetermined information indicating a location of a last significance coefficient. A significant bit indicates whether a transformation coefficient according to each scan index is a significant coefficient or 0, and may be expressed by significant_coeff_flag[i]. As will be described later, a significance map is set in units of subsets having a predetermined size which is obtained by splitting a transformation unit. Accordingly, significant_coeff_flag[i] indicates whether a transformation coefficient of an i-th scan index from among transformation coefficients included in a subset included in a transformation unit is 0 or not.

According to the conventional H.264, a flag (End-Of-Block) indicating whether each significant coefficient is the last significant coefficient or not is additionally entropy encoded or decoded. However, according to an embodiment of the present invention, location information of the last significant coefficient itself is entropy encoded or decoded. As described above with reference to FIGS. 1 through 13, the size of a transformation unit according to an embodiment of the present invention is not limited to 4×4 but may also be a larger size such as 8×8, 16×16, or 32×32. It is inefficient to additionally entropy encode or decode a flag (End-Of-Block) indicating whether each significant coefficient is the last significant coefficient since the size of the flag (End-Of-Block) increases. Accordingly, according to an embodiment of the present invention, the location information of the last significant coefficient itself may be entropy coded or decoded. For example, if a location of the last significant coefficient is (x, y), where x and y are integers, coordinate values of (x, y) may be entropy encoded or decoded.

Figure 15:
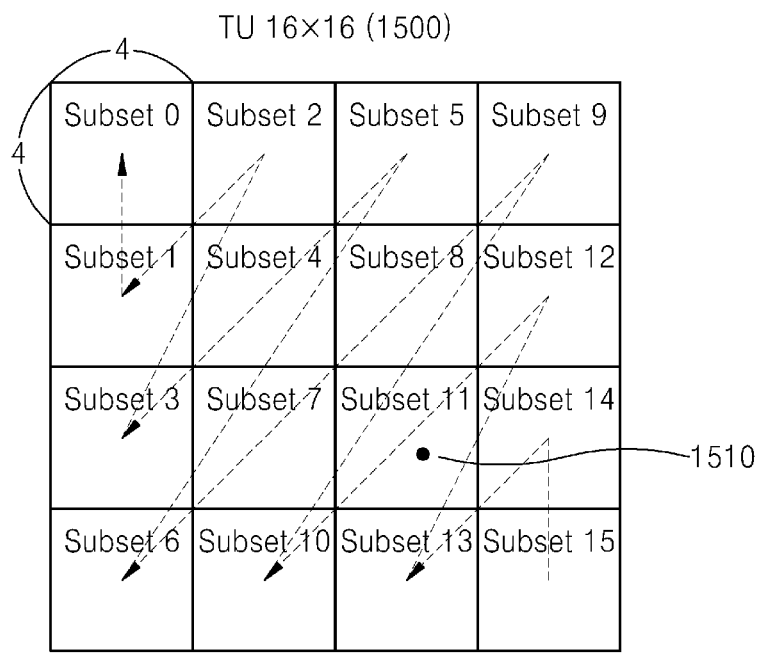
FIG. 15 illustrates subsets obtained by splitting a transformation unit according to an embodiment of the present invention.

FIG. 15 illustrates subsets obtained by splitting a transformation unit according to an embodiment of the present invention. While a 16×16 size of a transformation unit 1500 is illustrated in FIG. 15, the size of the transformation unit 1500 is not limited to 16×16 and may also be from 4×4 to 32×32.

Referring to FIG. 15, for entropy encoding and decoding of a transformation coefficient included in the transformation unit 1500, the transformation unit 1500 is split into subsets having a predetermined size. For example, as illustrated in FIG. 15, the transformation unit 1500 may be split into subsets having a 4×4 size. The size of the subsets is not limited to 4×4 and may be various.

As illustrated in FIG. 15, the transformation unit 1500 is split into 16 subsets, and transformation coefficient information is entropy encoded or decoded for each subset unit. The transformation coefficient information that is entropy encoded or decoded may be, for example, a first critical value flag (Greaterthan1 flag, hereinafter referred to as "Gtr1 flag") indicating whether a significant coefficient included in a subset has a greater value than a predetermined first critical value such as 1, a second critical value flag (Greaterthan2 flag, hereinafter referred to as "Gtr2 flag") indicating whether a significant coefficient included in a subset has a greater value than a predetermined second critical value such as 2, or level-3 indicating a level of a significant coefficient that is greater than a predetermined second critical value. Here, it is assumed that the first critical value is set to 1, and the second critical value is set to 2, but the first and second critical values are not limited thereto and may be modified. The first critical value flag (Gtr1 flag) is set only for a transformation coefficient including a significance map of 1, that is, only for a significant coefficient, and is not set for a transformation coefficient of 0. In addition, the second critical value flag (Gtr2 flag) is set only for a transformation coefficient having a first critical value flag of 1.

In FIG. 15, a subset including the last significant coefficient is assumed as a subset 11 1510. Entropy encoding and decoding of transformation coefficient information performed for each subset is performed backwards according to a scanning order from the subset 11 1510 in which the last significant coefficient is included.

FIG. 16 illustrates a subset 1600 included in the transformation unit 1500 of FIG. 15, according to an embodiment of the present invention.

Referring to FIGS. 15 and 16, any subset included in the transformation unit 1500 illustrated in FIG. 15 is assumed as including transformation coefficients having a 4×4 size as illustrated in FIG. 16. As described above, according to an embodiment of the present invention, a significance map SigMap, a first critical value flag Gtr1 flag, and a second critical value flag Gtr2 flag are entropy encoded or decoded in units of subsets.

FIG. 17 illustrates a significance map SigMap 1700 corresponding to the subset 1600 of FIG. 16.

Referring to FIGS. 16 and 17, the significance map SigMap 1700 having a value of 1 with respect to significant coefficients from among transformation coefficients which are included in the subset 1600 of FIG. 16 and which do not have a value of 0 is set. The significance map SigMap 1700 is entropy encoded or decoded using a predetermined context model.

FIG. 18 illustrates a first critical value flag Gtr1 flag 1800 corresponding to the subset 1600 of FIG. 16.

Referring to FIGS. 16 through 18, the first critical value flag Gtr1 flag 1800 indicating whether a corresponding transformation coefficient has a value greater than a first critical value, that is, 1, with respect to transformation coefficients having a value of 1 is set. If the critical value flag Gtr1 flag 1800 is 1, this indicates that a corresponding transformation coefficient has a value greater than 1, and if the critical value flag Gtr1 flag 1800 is 0, this indicates that a corresponding coefficient has a value of 1.

FIG. 19 illustrates a second critical value flag Gtr2 flag 1900 corresponding to the subset 1600 of FIG. 16.

Referring to FIGS. 16 through 19, the second critical value flag Gtr2 flag 1900 is set only with respect to a transformation coefficient for which the first critical value flag Gtr1 flag 1800 is set as 1 among transformation coefficients, and the second critical value flag Gtr2 flag 1900 indicates whether a corresponding transformation coefficient has a value greater than a second critical value, that is, 2.

Referring to FIG. 19, level information of a transformation coefficient having a second critical value flag Gtr2 flag 1900 of 1, that is, transformation coefficients having a value of 23 and 3 in FIG. 16, itself is entropy encoded or decoded. Here, a transformation coefficient including a second critical value flag Gtr2 flag 1900 of 1 is a transformation coefficient that has a greater value than 2, and thus, a value obtained by subtracting 3 from a level of a corresponding transformation coefficient (level-3) is encoded as level information of a corresponding transformation coefficient. In the above-described example, when performing entropy encoding, 20 is encoded instead of 23, and 0 is encoded as level information instead of 3. When performing entropy decoding, level information of a transformation coefficient may be restored by entropy decoding level-3 of a transformation coefficient including the second critical value flag Gtr2 flag 1900 of 1, and then adding 3 thereto.

FIG. 20 is a table showing transformation coefficients included in the subsets illustrated in FIGS. 16 through 19 and transformation coefficient information that is entropy encoded or decoded. As described above, according to an embodiment of the present invention, a significance map SigMap, a first critical value flag Gtr1 flag, a second critical value flag Gtr2 flag, and level information (level-3) indicating a location and level information of a significant coefficient are entropy encoded or decoded according to a predetermined scanning order from the last significant coefficient in units of subsets.

Figure 21A:
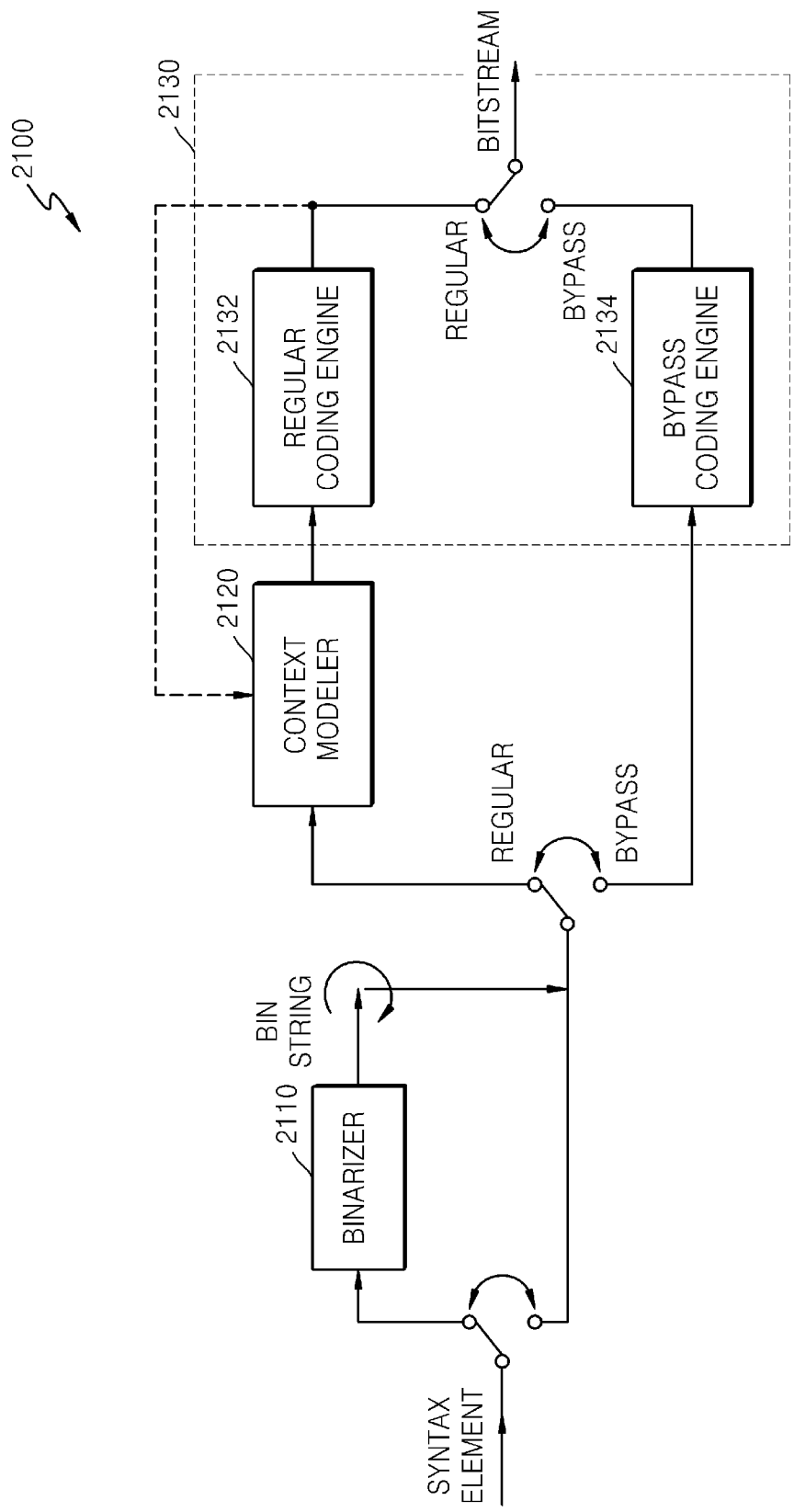
FIG. 21A is a structural block diagram illustrating an entropy encoding apparatus according to an embodiment of the present invention.

FIG. 21A is a structural block diagram illustrating a structure of an entropy encoding apparatus 2100 according to an embodiment of the present invention. The entropy encoding apparatus 2100 of FIG. 21A corresponds to the entropy encoder 120 of the video encoding apparatus 100 of FIG. 1.

Referring to FIG. 21A, the entropy encoding apparatus 2100 includes a binarizer 2110, a context modeler 2120, and a binary arithmetic coder 2130. Also, the binary arithmetic coder 2130 includes a regular coding engine 2132 and a bypass coding engine 2134.

Syntax elements that are input to the entropy encoding apparatus 2100 may not be binary values, and thus, if the syntax elements are not binary values, the binarizer 2110 binarizes the syntax elements to output a bin string consisting of binary values of 0 or 1. Bin denotes each bit of a stream consisting of 0 or 1, and is encoded by context adaptive binary arithmetic coding (CABAC). If a syntax element is data including 0 and 1 at the same frequencies, the syntax element is output to the bypass coding engine 2134, which does not use a probability value.

The context modeler 2120 provides a probability model about a current encoding symbol to the regular coding engine 2132. In detail, the context modeler 2120 outputs probabilities of binary values for encoding binary values of a current encoding symbol to the binary arithmetic coder 2130. A current encoding symbol refers to each binary value when an encoded current syntax element is formed by binarization, that is, when formed of a binary value.

A context model is a probability model with respect to a bin, and includes information indicating which of 0 and 1 corresponds to a most probable symbol (MPS) and a least probable symbol (LPS) and a probability of an MPS or an LPS. Hereinafter, a context model may be simply referred to as a context. Also, a context set refers to a set including a plurality of contexts.

The regular coding engine 1432 performs binary arithmetic encoding on a current encoding symbol based on information about an MPS or an LPS and probability information of the MPS or the LPS provided by from the context modeler 1420.

As will be described later, in order to determine a context model for entropy encoding of a first critical value flag Gtr1 flag of a subset, the context modeler 2120 according to an embodiment of the present invention obtains a context set index ctxset for determining a context set used in entropy encoding of the first critical value flag from among a plurality of context sets including a plurality of contexts, based on color component information of a transformation unit, location information of a subset indicating at which location a current subset is located in the transformation unit, and whether there are significant coefficients having a value greater than the first critical value in a subset that is processed before the current subset according to the order of processing describe with respect to FIG. 15 above. In addition, the context modeler 2120 obtains a context offset c1 for determining one of a plurality of contexts included in a context set used in entropy encoding of the first critical value flag Gtr1 flag based on a length of a previous transformation coefficient having consecutive 1s. Also, the context modeler 2120 obtains a context index ctxIdx1 indicating a context used in entropy encoding of the first critical value flag Gtr1 flag by using the context set index ctxset and the context offset c1. When always entropy encoding or decoding the first critical value flag Gtr1 flag of a transformation unit, a value of the context offset c1 is maintained or modified, and thus, the context is always maintained or updated every time when entropy encoding or decoding the first critical value flag Gtr1 flag of the transformation unit.

Also, the context modeler 2120 obtains a context set index ctxset indicating one of a plurality of context sets used in entropy encoding and decoding of a second critical value flag Gtr2 flag based on color component information of a transformation unit, location information of a subset indicating at which location a current subset is located in the transformation unit, and whether there are significant coefficients having a value greater than the first critical value in a subset that is processed before the current subset according to the order of processing described with respect to FIG. 15 above. A parameter used to obtain the context set index ctxset used in entropy encoding and decoding of the second critical value flag Gtr2 flag is the same as a parameter used to obtain the context set index ctxset that is used in entropy encoding and decoding of the first critical value flag Gtr1 flag. Accordingly, the context modeler 2120 may use the context set index ctxset for determining a context set used in entropy encoding of the first critical value flag described above also when determining a context set for entropy encoding of the second critical value flag Gtr2 flag. A context offset c2 for determining one of a plurality of contexts included in a context set that is used in entropy encoding of the second critical value flag Gtr2 flag has a value of 0. Accordingly, a context index ctxIdx2 indicating a context used in entropy encoding of the second critical value flag Gtr2 flag is set to be the same as the context set index ctxset of the first critical value flag Gtr1 flag.

Figure 21B:
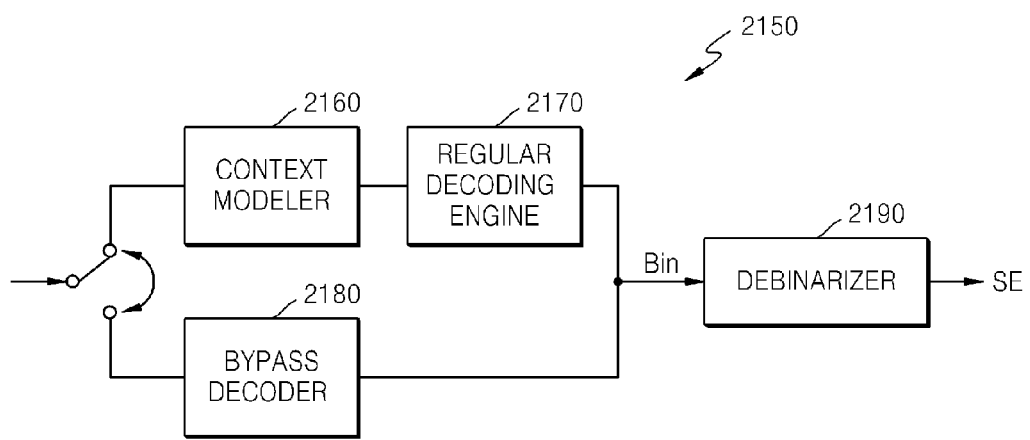
FIG. 21B is a structural block diagram illustrating an entropy decoding apparatus according to an embodiment of the present invention.

FIG. 21B is a structural block diagram illustrating a structure of an entropy decoding apparatus 2150 according to an embodiment of the present invention. The entropy decoding apparatus 2150 of FIG. 21B corresponds to the entropy decoder 220 of the video decoding apparatus 200 of FIG. 2. The entropy decoding apparatus 2150 performs a reverse operation of entropy encoding performed in the entropy encoding apparatus 2100 described above.

Referring to FIG. 21B, the entropy decoding apparatus 2150 includes a context modeler 2160, a regular decoding engine 2170, a bypass decoder 2180, and a de-binarizer 2190.

A symbol that is encoded by bypass encoding is output to the bypass decoder 2180 to be decoded, and a symbol encoded by regular encoding is decoded by the regular decoding engine 2170. The regular decoding engine 2170 arithmetically decodes a binary value of a current encoding symbol based on a context model provided by the context modeler 2160.

The context modeler 2160 determines a context model for entropy decoding of a first critical value flag Gtr1 flag and a second critical value flag Gtr2 flag in the same manner as the context modeler 2120 of FIG. 21A described above. The context modeler 2160 of FIG. 21B determines a context model for entropy decoding of a first critical value flag Gtr1 flag and a second critical value flag Gtr2 flag in the same manner as the context modeler 2120 of FIG. 21A described above with respect to encoding except that it operates with respect to decoding.

The de-binarizer 2340 restores bin strings that are restored in the regular decoding engine 2170 or the bypass decoder 2180 to syntax elements.

Hereinafter, an operation of determining a context model for entropy encoding and decoding of a first critical value flag Gtr1 flag and a second critical value flag Gtr2 flag conducted by using the context modelers 2120 and 2160 of FIGS. 21A and 21B will be described in detail.

Figure 22:
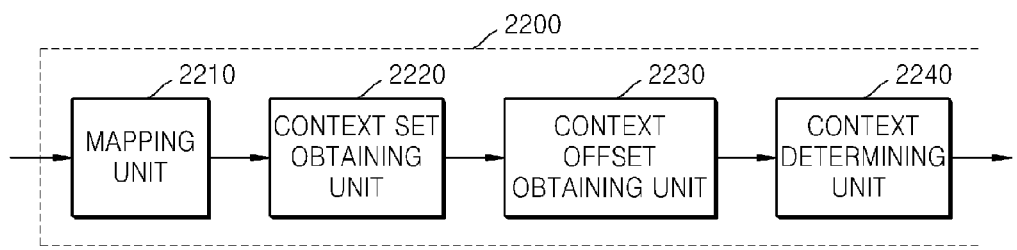
FIG. 22 is a structural block diagram illustrating a context modeler according to an embodiment of the present invention.

FIG. 22 is a structural block diagram illustrating a context modeler 2200 according to an embodiment of the present invention.

Referring to FIG. 22, the context modeler 2200 includes a mapping unit 2210, a context set obtaining unit 2220, a context offset obtaining unit 2230, and a context determining unit 2240.

The mapping unit 2210 obtains location information of a significant coefficient included in a current subset that is entropy encoded or decoded. When performing entropy encoding, the mapping unit 2210 may obtain locations of significant coefficients from information of transformation coefficients included in the current subset. When performing entropy decoding, the mapping unit 2210 may obtain locations of significant coefficients included in a subset from a significance map SigMap.

The context set obtaining unit 2220 obtains a context set index ctxset indicating one of a plurality of context sets including a plurality of contexts which are used in entropy encoding and decoding of a first critical value flag Gtr1 flag and a second critical value flag Gtr2 flag regarding a significant coefficient.

In detail, the context set obtaining unit 2220 obtains a context set index for determining a context model used in entropy encoding and decoding of a first critical value flag Gtr1 flag and a second critical value flag Gtr2 flag based on color component information of a transformation unit, location information of a current subset that is being processed, and whether there are significant coefficients having a value greater than a first critical value in a subset that is processed before the current subset.

The context offset obtaining unit 2230 determines a context offset indicating one of a plurality of contexts included in the context set index ctxset. When performing entropy encoding or decoding on the first critical value flag Gtr1 flag, the context offset c1 may be determined based on a length of a previous transformation coefficient having consecutive 1s before a current significant coefficient that is processed while significant coefficients included in the current subset are being processed according to a predetermined scanning order. A context offset c2 of the second critical value flag Gtr2 flag has a value of 0.

The context determining unit 2240 obtains a context index ctxIdx1 indicating a context used in entropy encoding or decoding of a first critical value flag Gtr1 flag by using the context set index ctxset and the context offset c1. For entropy encoding and decoding of the first critical value flag Gtr1 flag, when it is assumed that n context sets (n is an integer) are set, and n context sets have m contexts (m is an integer), a total of n*m contexts may be used in entropy encoding or decoding of a first critical value flag Gtr1 flag. When assuming that a context set index ctxSet indicating one of n context sets is an integer from 0 to (n−1) and a context offset c1 indicating one of m context offsets is an integer from 0 to (m−1), a context index ctxIdx1 indicating one of n*m contexts may be determined based on the following equation: ctxIdx1=ctxSet*m+c1.

A context index ctxIdx2 indicating one context used in entropy encoding and decoding of a second critical value flag Gtr2 flag may be determined based on the following equation: ctxIdx2=ctxSet*1+c2. As described above, since c2 is 0, the context index ctxIdx2 indicating a context used in entropy encoding and decoding of the second critical value flag Gtr2 flag is determined based on only a value of a set index ctxSet.

Figure 23:
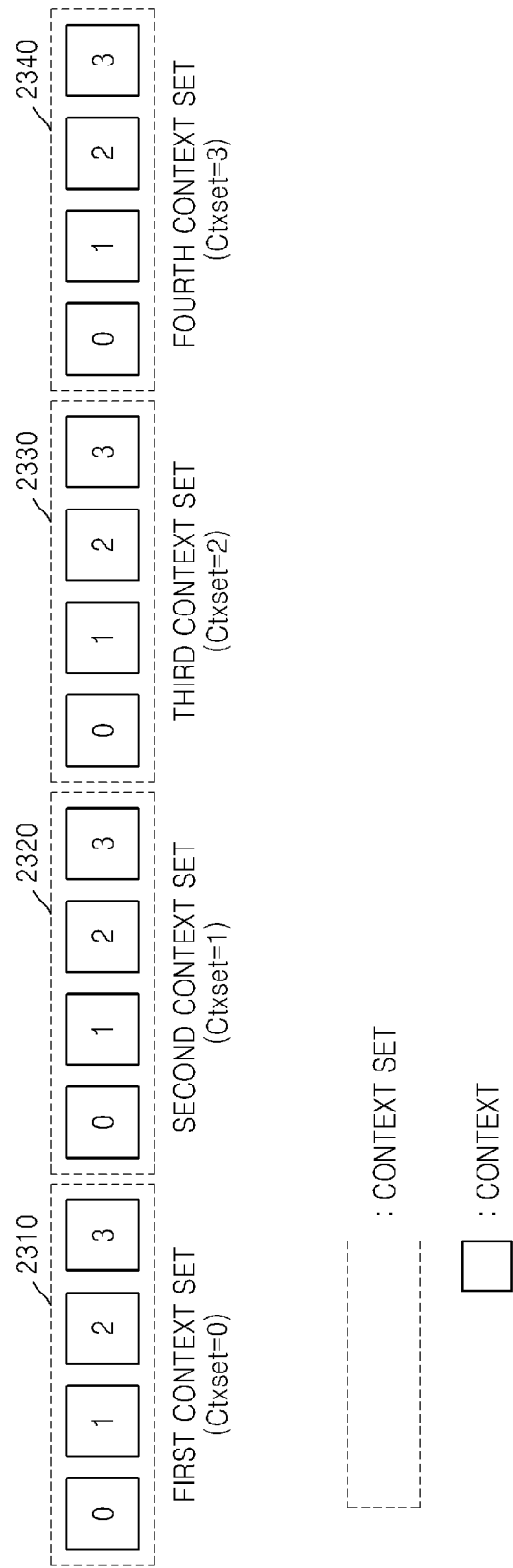
FIG. 23 illustrates a plurality of context sets applied to a transformation unit of a luminance component and a plurality of contexts included in each context set, according to an embodiment of the present invention.
Figure 24:
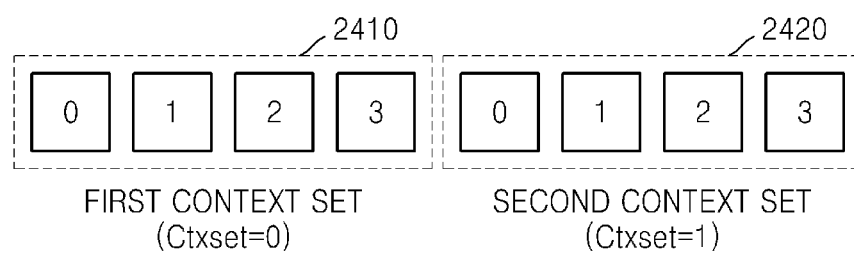
FIG. 24 illustrates a plurality of context sets applied to a transformation unit of a chrominance component and a plurality of contexts included in each context set, according to an embodiment of the present invention.

FIG. 23 illustrates a plurality of context sets applied to a transformation unit of a luminance component and a plurality of contexts included in each context set according to an embodiment of the present invention. FIG. 24 illustrates a plurality of context sets applied to a transformation unit of a chrominance component and a plurality of contexts included in each context set according to an embodiment of the present invention.

Referring to FIG. 23, for entropy encoding and decoding of a first critical value flag Gtr1 flag with respect to a transformation coefficient included in a luminance component subset, a context included in any one of a first context set 2310, a second context set 2320, a third context set 2330, and a fourth context set 2340 is used. Different contexts that are included in any one of the four context sets may be distinguished by a context offset c1 from 0 to 3, as illustrated in FIG. 23. Accordingly, a context from among the total of 16 contexts that are to be applied to the first critical value flag Gtr1 flag of a transformation unit of a subset of a luminance component may be determined by using a context set index ctxset and a context offset c1. That is, a context index ctxIdx1 indicating one of the total of 16 contexts that are to be applied to the first critical value flag Gtr1 flag of a transformation unit of a subset of a luminance component may be determined by the following equation: ctxIdx1=ctxSet*4+c1.

Similarly, when referring to FIG. 24, for entropy encoding and decoding of a first critical value flag Gtr1 flag with respect to a transformation unit included in a chrominance component subset, a context included in any one of context sets from a total of two context sets, a first context set 2410 and a second context set 2420 is used. Different contexts included in a context set may be distinguished by a context offset c1_chroma from 0 to 3 as illustrated in FIG. 24. As will be described later, a context offset c1_chroma regarding a chrominance component may be set in the same manner as the context offset c1 with respect to a luminance component. A context index ctxIdx1_chroma indicating one of a total of 8 contexts that are to be applied to a first critical value Gtr1 flag of a transformation coefficient included in a subset of a chrominance component may be determined by the following equation: ctxIdx1_chroma=ctxSet*4+c1_chroma.

FIG. 27A illustrates a context set index ctxset for determining a context set used in entropy encoding and decoding of a first critical value flag Gtr1 flag and a second critical value flag Ctr2 flag of a significant coefficient of a luminance component and a significant coefficient of a chrominance component according to an embodiment of the present invention.

Referring to FIG. 27A, the context set obtaining unit 2220 obtains a context set index ctxset for determining a context set used in entropy encoding and decoding of a first critical value flag Gtr1 flag and a second critical value flag Gtr2 flag based on color component information of a transformation unit, location information of a current subset that is being processed, and whether there are significant coefficients having a value greater than a first critical value in a subset that is processed before the current subset.

For example, regarding a transformation coefficient included in a transformation unit of a luminance component, if there is no significant coefficient having a value greater than 1, in a previously processed subset (NoGreatT1), and when entropy encoding or decoding a first critical value flag of a significant coefficient included in a subset located at the upper side of the leftmost location, a first context set (ctxset=0) is obtained. If there is no significant coefficient having a value greater than 1, in a previously processed subset (at least one GreatT1), and when entropy encoding or decoding a first critical value flag of a significant coefficient included in a subset (subset 0) located at the upper side of the leftmost location, a second context set (ctxset=1) is obtained. If there is no significant coefficient having a value greater than 1, in a previously processed subset (No GreatT1), and when entropy encoding or decoding a first critical value flag of a significant coefficient included in a subset (other subsets) that is not located at the upper side of the leftmost location, a third context set (ctxset=2) is obtained. Also, if there is a significant coefficient having a value greater than 1, in a previously processed subset (at least one GreatT1), and when entropy encoding or decoding a first critical value flag of a significant coefficient included in a subset (other subsets) that is not located at the upper side of the leftmost location, a fourth context set (ctxset=3) is obtained.

Regarding a transformation coefficient included in a transformation unit of a chrominance component, a context set is obtained based only on whether there is a significant coefficient having a value greater than 1 in a previously processed subset. In other words, if there is no significant coefficient having a value greater than 1 in a previously processed subset (No GreatT1), a first context set (ctxset=0) is obtained, and if there is a significant coefficient having a value greater than 1 in a previously processed subset (at least one GreatT1), a second context set (ctxset=1) is obtained.

FIG. 27B illustrates a context offset used in entropy encoding and decoding of a first critical value flag Gtr1 flag and a second critical value flag Gtr2 flag according to an embodiment of the present invention.

Referring to FIG. 27B, in order to determine a context included in a context set used in entropy encoding and decoding of a first critical value flag Gtr1 flag, a first context offset (c1=0) is obtained for significant coefficients having a value greater than 1 from among significant coefficients included in a subset. Regarding a significant coefficient that is processed the first time from among significant coefficients included in a subset, a second context offset (c1=1) is obtained. If a length of a previous transformation coefficient having consecutive 1s is 1, a third context offset (c1=2) is obtained. If a length of a previous transformation coefficient having consecutive 1s is 2 or more, a fourth context offset (c1=3) is obtained. A context offset c1 may be applied to both a luminance component and a chrominance component.

A context offset c2 used in entropy encoding and decoding of a second critical value flag Gtr2 flag has a value of 0.

When a context set index ctxset and a context offset c1 or c2 for entropy encoding or decoding of a transformation coefficient included in a subset is determined based on tables of FIGS. 27A and 27B, the context determining unit 2240 determines a context index ctxIdx1 indicating one of the total of 16 contexts that are to be applied to the first critical value flag Gtr1 flag of a transformation unit included in a subset of a luminance component according to the following equation: ctxIdx1=ctxSet*4+c1. Also, the context determining unit 2240 determines a context index ctxIdx1_chroma indicating one of the total of 8 contexts that are to be applied to the first critical value flag Gtr1 flag of a transformation unit included in a subset of a chrominance component according to the following equation: ctxIdx1_chroma=ctxSet*4+c1. Referring to the tables of FIGS. 27A and 27B, a total of contexts applied to the first critical value flag Gtr1 flag is 24, that is, 4×4=16 for a luminance component plus 2×4=8 for a chrominance component.

Also, the context determining unit 2240 determines a context index ctxIdx2 indicating a context to be applied to the second critical value flag Gtr2 flag according to the following equation: ctxIdx2=ctxset*1+c2. That is, a context index ctxIdx2 indicating a context to be applied to a second critical value flag Gtr2 flag is set to be the same as a value of a context set index ctxset. Accordingly, referring to the tables of FIGS. 27A and 27B, a total of contexts applied to the first critical value flag Gtr1 flag is 8, that is, 4 for a luminance component and 4 for a chrominance component.

Figure 25:
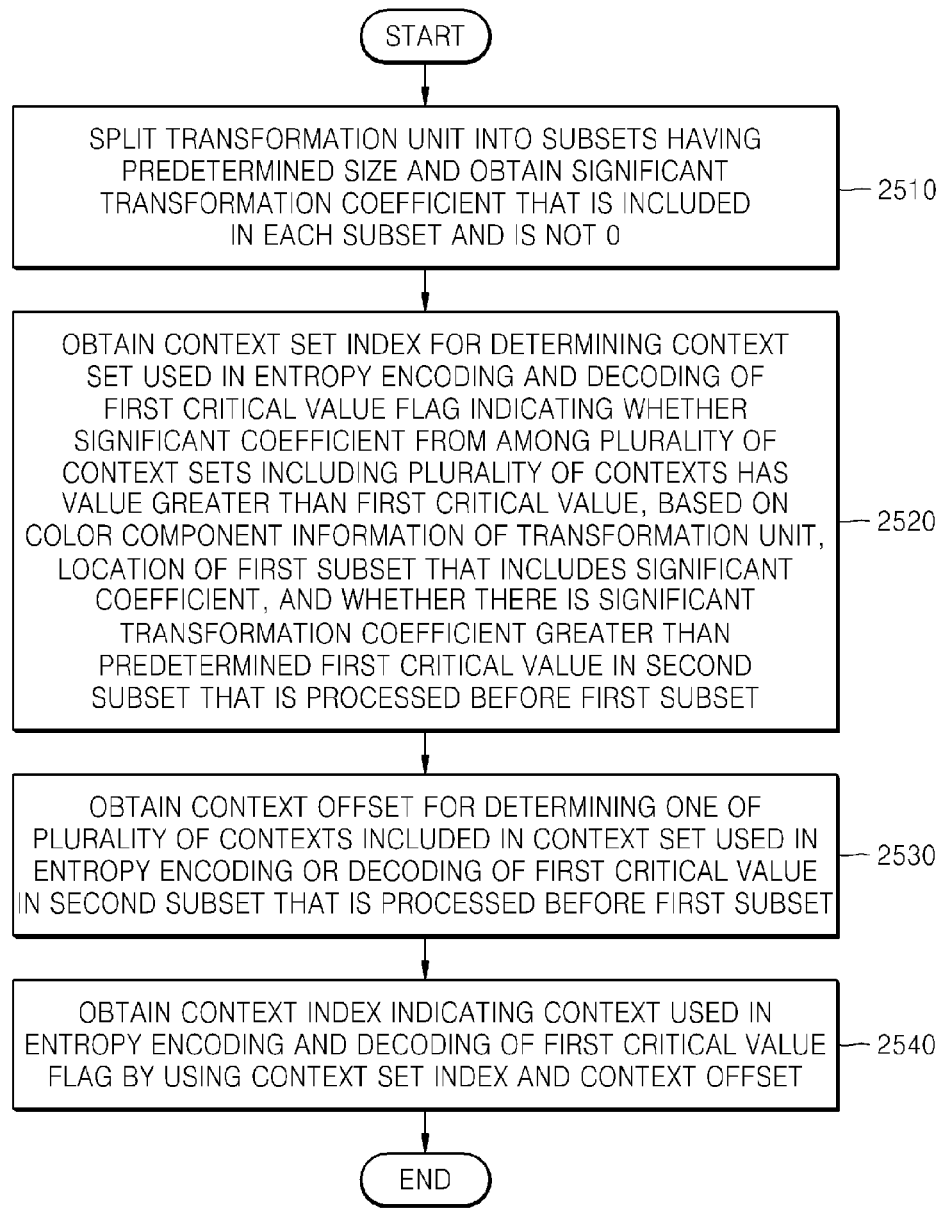
FIG. 25 is a flowchart illustrating a method of determining a context model for entropy encoding and decoding of a transformation coefficient level, according to an embodiment of the present invention.

FIG. 25 is a flowchart illustrating a method of determining a context model for entropy encoding and decoding of a transformation coefficient level, according to an embodiment of the present invention.

Referring to FIG. 25, in operation 2510, the mapping unit 2210 splits a transformation unit into subsets having a predetermined unit and obtains a significant coefficient that is included in each subset and is not 0. As described above, when performing entropy encoding, the mapping unit 2210 may obtain a location of a significant coefficient from information of transformation coefficients included in a current subset. When performing entropy decoding, the mapping unit 2210 may obtain a location of a significant coefficient included in a subset from a significance map SigMap.

In operation 2520, the context set obtaining unit 2220 obtains a context set index ctxset for determining a context set used in entropy encoding and decoding of a first critical value flag indicating whether a significant coefficient from among a plurality of context sets including a plurality of contexts has a value greater than a first critical value, based on color component information of a transformation unit, a location of a first subset that includes a significant coefficient and is currently processed, and whether there is a significant coefficient greater than a predetermined first critical value in a second subset that is processed before the first subset. As shown in FIGS. 27A and 27B, the context set obtaining unit 2220 may obtain a context set ctxset indicating a context set from among four context sets depending on whether the location of a first subset is a subset0 located at the upper side of the leftmost position, and whether there is a significant coefficient having a value greater than 1 in a previously processed subset, regarding a transformation coefficient included in a transformation unit of a luminance component. Also, the context set obtaining unit 2220 may obtain a context set ctxset indicating one of two context sets based only on whether there is a significant coefficient having a value greater than 1 in a previously processed subset, with respect to a transformation coefficient included in a transformation unit of a chrominance component.

In operation 2530, the context offset obtaining unit 2230 obtains a context offset for determining one of a plurality of contexts included in a context set used in entropy encoding or decoding of the first critical value flag Gtr1 flag based on a length of a previous transformation coefficient having consecutive 1s. As described above, the context offset obtaining unit 2230 may determine a context offset c1 based on a length of the previous transformation coefficient consecutive 1s before a current significant coefficient that is processed while significant coefficients included in the current subset are being processed according to a predetermined scanning order. The context offset obtaining unit 2230 may set a context offset c2 which is used in entropy encoding and decoding of a second critical value flag Gtr2 flag, to always have a value of 0 without having to consider other parameters.

In operation 2540, the context determining unit 2240 obtains a context index ctxIdx1 indicating a context used in entropy encoding and decoding of a first critical value flag Gtr1 flag by using a context set index ctxset and a context offset c1. As described above, when assuming that a context set index ctxSet indicating one of n context sets are integers from 0 to (n−1), and a context offset c1 indicating one of m context offsets is an integer from 0 to (m−1), the context determining unit 2240 may determine a context index ctxIdx1 indicating one of n*m contexts according to the following equation: ctxIdx1=ctxSet*m+c1. Also, the context determining unit 2240 may determine a context index ctxIdx2 indicating one context used in entropy encoding and decoding of a second critical value flag Gtr2 flag according to the following equation: ctxIdx2=ctxSet*1+c2. Since c2 is 0, the context index ctxIdx2 indicating a context used in entropy encoding and decoding of the second critical value flag Gtr2 flag is determined based on only a value of a set index ctxSet.

Figure 26:
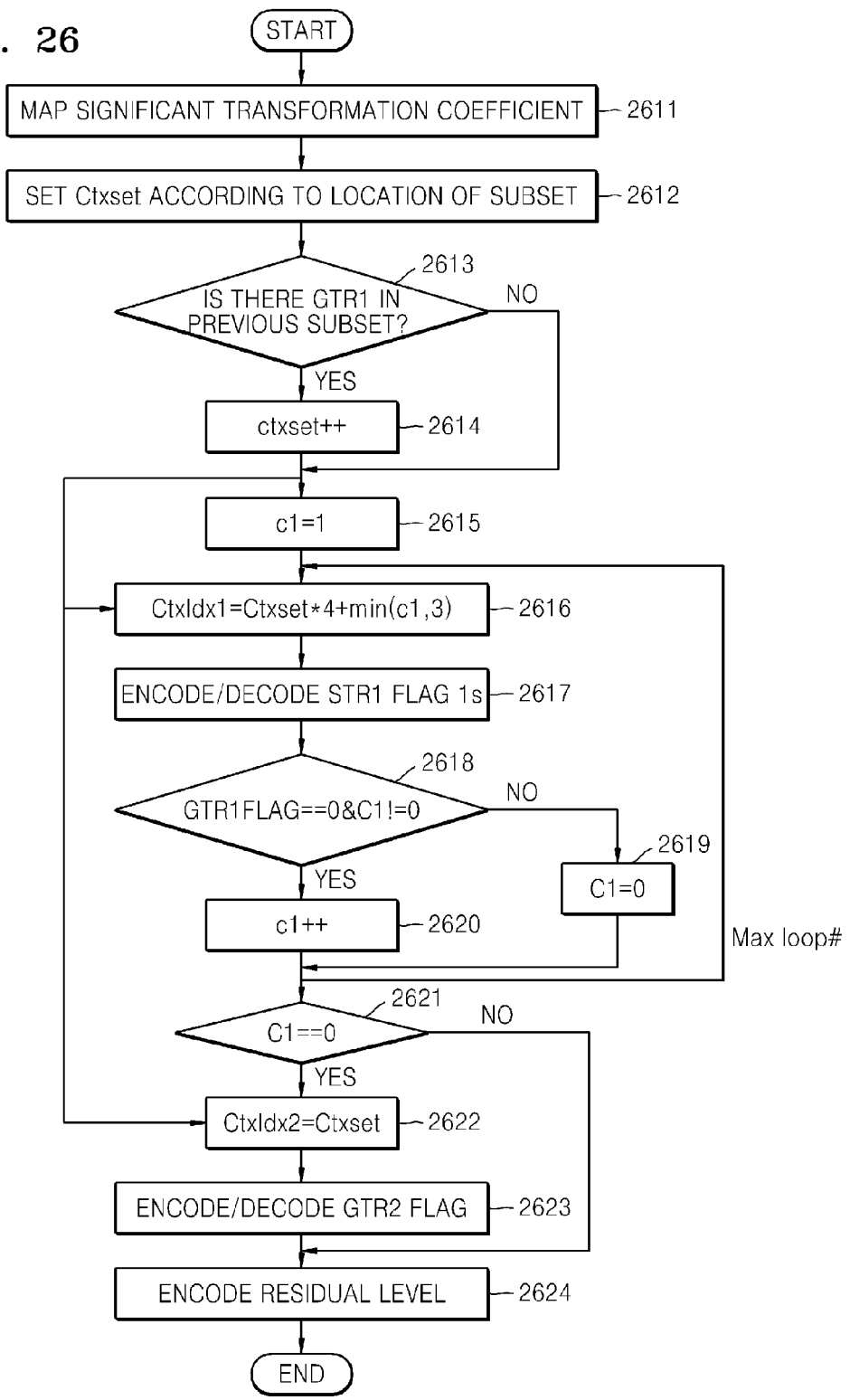
FIG. 26 is a detailed flowchart illustrating a method of determining a context model for entropy encoding and decoding of a transformation coefficient level, according to an embodiment of the present invention.

FIG. 26 is a detailed flowchart illustrating a method of determining a context model for entropy encoding and decoding of a transformation coefficient level, according to an embodiment of the present invention.

Referring to FIG. 26, in operation 2611, the mapping unit 2210 splits a transformation unit into subsets having a predetermined size and obtains a significant coefficient that is included in each subset and is not 0.

In operation 2612, the context set obtaining unit 2220 determines a context set index ctxset based on a location of a current subset and color component information from among parameters that are used in determining a context set. For example, when a current subset is a subset0 located at the upper side of the leftmost position of a transformation unit or a chrominance component, ctxset is set to 0, and if the current subset is not a subset located at the upper side of the leftmost position of a transformation unit and is a luminance component, ctxset is set to 2.

In operation 2613, the context set obtaining unit 2220 determines whether there is a significant coefficient having a value greater than a first critical value in a previous subset that is processed just before a current subset. As a result of determining in operation 2613, if there is a significant coefficient having a value greater than a first critical value in a previous subset, the context set obtaining unit 2220 increases a value of the context set index ctxset set in operation 2612 by 1; otherwise, if there is no significant coefficient having a value greater than the first critical value in a previous subset, the context set obtaining unit 2200 maintains the value of the context set index ctxset set in operation 2612.

In operation 2615, the context offset obtaining unit 2230 sets a value of the context offset c1 to be applied to a first critical value flag Gtr1 flag of a significant coefficient of a current subset that is processed the first time.

In operation 2616, the context determining unit 2240 obtains a context index ctxIdx1 indicating a context to be applied to a first critical value flag Gtr1 flag according to the following equation: ctxIdx1=ctxset*4+min(c1, 3). The equation is based on FIGS. 27A and 27B, and a length of a transformation coefficient having consecutive 1s is determined in operation 2620, and the context offset index c1 may have a value of 3 or greater if at least three first critical value flags Gtr1 flag continue. However, referring to FIG. 27B, as a context offset index c1 is set to have a value of 2 for at least two consecutive 1s, min(c1,3) is used to limit the context offset index c1 to not be greater than 3.

In operation 2617, the regular coding engine 2132 and the regular decoding engine 2170 entropy encode or decode the first critical value flag Gtr1 flag based on a context model indicated by the obtained context index ctxIdx1.

In operation 2618, the context offset obtaining unit 2230 determines whether a first critical value flag Gtr1 flag, which is currently encoded or decoded, has a value of 0 and whether a context offset index c1 is 0 or not. The determination operation of operation 2618 is performed in order to determine the number of consecutive 1s from among significant coefficients. As a result of determining in operation 2618, if a currently encoded or decoded first critical value flag Gtr1 flag has a value of 0 and the context offset index c1 is not 0, the context offset index c1 is increased by 1 in operation 2620. As a result of determining of operation 2618, otherwise, if the currently encoded or decoded first critical value flag Gtr1 flag does not have a value of 0 or the context offset index c1 is 0, the context offset index c1 is reset to 1 in operation 2619.

Operations 2615 through 2620 are operations of entropy encoding or decoding of a first critical value flag Gtr1 flag of a transformation coefficient included in a subset. To speed up the operations, instead of entropy encoding or decoding a first critical value flag Gtr1 flag regarding every significant coefficient, only a first critical value flag Gtr1 flag may be entropy encoded or decoded for only a predetermined number (#) of significant coefficients from the last significant coefficient (max loop #). Level information of a significant coefficient whose corresponding first critical value flag Gtr1 flag is not entropy encoded or decoded is itself entropy encoded or decoded.

In operations 2621 through 2624, a second critical value flag Gtr2 flag is entropy encoded or decoded.

In operation 2621, whether a value of a context offset index c1 is 0 or not is determined. In operation 2622, a context index ctxIdx2 indicating a context to be applied for entropy encoding or decoding of a second critical value flag Gtr2 flag is set to be the same as the context set index ctxset that is determined when entropy encoding and decoding of the first critical value flag Gtr1 flag is performed.

In operation 2623, the regular coding engine 2132 and the regular decoding engine 2170 entropy encode or decode a second critical value flag Gtr2 flag based on a context model indicated by the obtained context index ctxIdx2.

In operation 2624, the regular coding engine 2132 and the regular decoding engine 2170 entropy encode or decode levels of transformation coefficients having a value greater than a second critical value. As described above, a level value (level-3) obtained by subtracting a predetermined value from a corresponding transformation coefficient may be entropy encoded or decoded.

FIG. 28 illustrates a table including transformation coefficients included in a subset of FIG. 20 and context offset indices c1 used in entropy encoding or decoding of transformation coefficient information that is entropy encoded or decoded, according to an embodiment of the present invention. As described above, the context offset index c1 is determined based on a length of a transformation coefficient having a continuous value of 1 and is assumed as being obtained according to FIG. 27B. Also, in FIG. 28, the order of processing of each transformation coefficient is assumed to be from left to right.

Also, here, it is assumed that the context set index ctxset for entropy encoding and decoding of a first critical value flag Gtr1 flag and the second critical value flag Gtr2 flag is determined not based on information about a transformation coefficient included in a current subset but based on color component information of a transformation unit, a location of the current subset, and whether there is a significant coefficient having a value greater than a first critical value in a subset that is processed before the current subset.

Referring to FIG. 28, a last significant coefficient (2810) of 1 of a subset that is initially processed is not greater than 1, and thus the first critical value flag Gtr1 flag has a value of 0. Referring to FIG. 27B, a context offset c1 with respect to the first critical value flag Gtr1 flag of an initially processed significant coefficient is set to 1.

Next, the context offset c1 regarding the first critical value flag Gtr1 flag of a next significant coefficient of the last significant coefficient (2810) has a value of 2. This is because there is previously the significant coefficient (2810) having a value of 1. Similarly, the context offset c1 regarding the first critical value flag Gtr1 flag of a next significant coefficient 2830 has a value of 3. This is because there are previously two significant coefficients (2810 and 2820) having two consecutive 1s.

As the first critical value flag Gtr1 flag of the significant transformation coefficient (2830) has a value of 1, the context offset c1 regarding the first critical value flag Gtr1 flag of all significant coefficients after the significant coefficient (2380) has a value of 0. This is because, if the first critical value flag Gtr1 flag has a value of 1 as a result of determining in operation 2618 of FIG. 26, the context offset c1 is set to 0 according to operation 2619, and thus the context offset c1 regarding all significant coefficients thereafter are set to 0.

FIG. 29 illustrates a table including transformation coefficients included in a subset and context offset indices c1 used in entropy encoding or decoding of transformation coefficient information that is entropy encoded or decoded, according to an embodiment of the present invention. Comparing FIGS. 28 and 29, FIG. 29 is different from FIG. 28 in that a last significant coefficient (2910) has a value of 2, and thus the first critical value flag Gtr1 flag has a value of 1. As described above, the context offset c1 regarding the first critical value flag Gtr1 flag of the significant coefficient 2910 that is initially processed is set to 1, and the context offset c1 regarding the first critical value flag GTR1 of all significant coefficient after the significant coefficient (2910) has a value of 0.

According to the method and apparatus for determining a context model described above, a context set index ctxset is obtained based on color component information of a transformation unit, a location of a current subset, and whether there is a significant coefficient having a value greater than a first critical value in a subset that is processed before the current subset, and a context offset c1 is obtained based on a length of a previous transformation coefficient having consecutive 1s.

The standards for determining a context index or a context offset are not limited to the embodiments of the present invention and may also be modified.

For example, as illustrated in Table 2, a context offset c1 may be set by grouping cases where probabilities are similar.

TABLE 2

| Context offset (C1) | |
| --- | --- |
| 0 | 1 or more larger than 1 |
| 1 | Initial- no trailing ones |
| 2 | 1 or 2 trailing one |
| 3 | 3 or more trailing one |

When comparing Table 2 and FIG. 27B, Table 2 shows one continuous transformation coefficient and two continuous transformation coefficients that are grouped in a same group to be mapped in one context. Also, context set may be grouped based on the number of significant coefficients equal to or greater than 1 included in a previous subset so as to set a context set index ctxset as shown in Table 3.

TABLE 3

| Context set index (ctxset) (with respect to a previous subset) | |
| --- | --- |
| 0 | Initial- no larger than one |
| 1 | 1 or 2 larger than one (one or two significant coefficients) |
| 2 | 3 or more larger than one (three or more significant coefficients) |

In addition, a context set index ctxset may be set as shown in Tables 4 through 6 below based on the type of a slice in which a current transformation unit is included, a location of a current subset, and the number of transformation coefficients having a value equal to or greater than a predetermined critical value in a previous subset.

TABLE 4

| Context set (ctxset)/in the case of slice I | | |
| --- | --- | --- |
| 0 | Subset0 | 0 largerT1 in previous subset |
| 1 | | 1-4 largerT1 in previous subset |
| 2 | | >4 largerT1 in previous subset |
| 3 | other | 0-1 largerT1 in previous subset |
| 4 | subsets | 1-4 largerT1 in previous subset |
| 5 | | >4 largerT1 in previous subset |

Referring to Table 4, for example, when entropy encoding or decoding transformation coefficients included in a subset of a transformation unit included in a slice I, one of 0 to 5 may be set as a value of a context set index ctxset based on a location of a current subset, whether the number of a transformation coefficient having a value equal to or greater than a predetermined critical value T1 in a previous subset is 0, 1 to 4, or more than 4.

TABLE 5

| Context set (ctxset)/in the case of slice P | | |
| --- | --- | --- |
| 0 | Subset0 | 0 largerT1 in previous subset |
| 1 | | 1-3 largerT1 in previous subset |
| 2 | | >3 largerT1 in previous subset |
| 3 | other | 0 largerT1 in previous subset |
| 4 | subsets | 1-3 largerT1 in previous subset |
| 5 | | >3 largerT1 in previous subset |

Referring to Table 5, for example, when entropy encoding or decoding transformation coefficients included in a subset of a transformation unit included in a slice P, one of 0 to 5 may be set as a value of a context set index ctxset based on a location of a current subset, whether the number of a transformation coefficient having a value equal to or greater than a predetermined critical value T1 in a previous subset is 0, 1 to 3, or more than 3.

TABLE 6

| Context set (ctxset)/in the case of slice B | | |
| --- | --- | --- |
| 0 | Subset0 | 0 largerT1 in previous subset |
| 1 | | 1-2 largerT1 in previous subset |
| 2 | | >2 largerT1 in previous subset |
| 3 | other | 0 largerT1 in previous subset |
| 4 | subsets | 1-2 largerT1 in previous subset |
| 5 | | >2 largerT1 in previous subset |

Referring to Table 6, for example, when entropy encoding or decoding transformation coefficients included in a subset of a transformation unit included in a slice B, one of 0 to 5 may be set as a value of a context set index ctxset based on a location of a current subset, whether the number of a transformation coefficient having a value equal to or greater than a predetermined critical value T1 in a previous subset is 0, 1 or 2, or more than 2.

The embodiments of the present invention can be written as computer programs and can be implemented in general-use digital computers that execute the programs using a computer-readable recording medium. Examples of the computer-readable recording medium include magnetic storage media (e.g., ROM, floppy disks, hard disks, etc.) and optical recording media (e.g., CD-ROMs or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of determining a context model for entropy decoding, the method comprising:
   determining a current transform unit based on size information of a transform unit, wherein the size information is obtained from a bitstream;
   when the current transform unit is a transform unit of a chroma component, determining a context set of a current sub-block in the current transform unit independently of a position of the current sub-block;
   when the current transform unit is a transform unit of a luminance component, determining the context set of the current sub-block in the current transform unit based on the position of the current sub-block; and
   determining a context model for obtaining first threshold value information based on the context set of the current sub-block, wherein the first threshold value information indicates whether a current transformation coefficient in the current sub-block is greater than a first threshold value.

2. The method of claim 1, wherein the first threshold value is 1.